(12) United States Patent
Karimli et al.

(10) Patent No.: US 11,128,980 B2
(45) Date of Patent: Sep. 21, 2021

(54) ENHANCED ALGORITHMS FOR IMPROVED USER EXPERIENCE USING INTERNET OF THINGS SENSOR INTEGRATION

(71) Applicant: T-Mobile USA, Inc., Bellevue, WA (US)

(72) Inventors: Yasmin Karimli, Kirkland, WA (US); Carl Williams, Maple Valley, WA (US); Jie Hui, Mercer Island, WA (US); Antoine T. Tran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 159 days.

(21) Appl. No.: 16/457,697

(22) Filed: Jun. 28, 2019

(65) Prior Publication Data

US 2020/0260218 A1 Aug. 13, 2020

Related U.S. Application Data

(60) Provisional application No. 62/805,252, filed on Feb. 13, 2019, provisional application No. 62/805,611, filed on Feb. 14, 2019, provisional application No. 62/852,556, filed on May 24, 2019.

(51) Int. Cl.
*H04W 4/02* (2018.01)
*H04W 4/024* (2018.01)
*G06Q 30/06* (2012.01)

(52) U.S. Cl.
CPC ........... *H04W 4/023* (2013.01); *H04W 4/024* (2018.02); *G06Q 30/0633* (2013.01)

(58) Field of Classification Search
CPC ........... G06Q 30/0269; G06Q 30/0261; G06Q 30/0267; G06Q 30/0277; G06Q 30/0271; G06Q 30/0251; H04W 4/029; H04W 4/23
See application file for complete search history.

(56) References Cited

U.S. PATENT DOCUMENTS

| | | | | |
|---|---|---|---|---|
| 9,609,484 B1* | 3/2017 | Rodoper | ............... | G01S 5/0284 |
| 9,767,474 B1* | 9/2017 | Ramalingam | ........ | G06Q 20/229 |
| 9,818,129 B2* | 11/2017 | Anand | ................... | G06Q 50/01 |
| 10,237,256 B1* | 3/2019 | Pena | ................... | H04L 63/0853 |
| 2011/0238289 A1* | 9/2011 | Lehmann | ........... | G01C 21/3617 |
| | | | | 701/533 |
| 2012/0108259 A1* | 5/2012 | Weiss | ................. | G06Q 30/0267 |
| | | | | 455/456.1 |
| 2012/0254804 A1* | 10/2012 | Sheha | ................... | H04M 1/724 |
| | | | | 715/834 |

(Continued)

*Primary Examiner* — Dung Hong
(74) *Attorney, Agent, or Firm* — Lee & Hayes, P.C.

(57) ABSTRACT

Techniques directed to utilizing networked devices to enhance user experience are described. In an example, sensor data received from sensor(s) associated with a facility can be used to determine a presence of a user equipment (UE) within or proximate to the facility. Based at least in part on the sensor data, an account associated with the UE can be accessed. Based at least in part on account data associated with the account, a distribution of network technology can be modified to temporarily enable the UE to access a service that is not otherwise available to at least one other UE within or proximate to the facility.

18 Claims, 8 Drawing Sheets

(56) References Cited

U.S. PATENT DOCUMENTS

| | | | |
|---|---|---|---|
| 2013/0030931 A1* | 1/2013 | Moshfeghi | H04W 4/80 |
| | | | 705/16 |
| 2013/0191195 A1* | 7/2013 | Carlson | G06Q 30/0224 |
| | | | 705/14.17 |
| 2014/0180817 A1* | 6/2014 | Zilkha | G06Q 30/0239 |
| | | | 705/14.55 |
| 2014/0196025 A1* | 7/2014 | Corinella | H04W 4/21 |
| | | | 717/178 |
| 2015/0051975 A1* | 2/2015 | Kadous | G06Q 30/0261 |
| | | | 705/14.58 |
| 2015/0112826 A1* | 4/2015 | Crutchfield, Jr. | G06Q 30/0601 |
| | | | 705/26.1 |
| 2016/0148262 A1* | 5/2016 | Glover | G06Q 30/0276 |
| | | | 705/14.54 |
| 2016/0227359 A1* | 8/2016 | Hurewitz | G06Q 30/0261 |
| 2018/0211718 A1* | 7/2018 | Heath | A01K 29/005 |
| 2018/0260845 A1* | 9/2018 | Peterson | G06Q 30/0255 |
| 2019/0268743 A1* | 8/2019 | Cho | G09F 21/042 |
| 2020/0051132 A1* | 2/2020 | Zavesky | G06T 11/00 |

\* cited by examiner

ENHANCED ALGORITHMS FOR IMPROVED USER EXPERIENCE USING INTERNET OF THINGS SENSOR INTEGRATION

PRIORITY

This patent application claims priority to U.S. Patent Provisional Application No. 62/805,252, filed on Feb. 13, 2019, and entitled "User Identification via Sensors in Facility," U.S. Patent Provisional Application No. 62/805,611, filed on Feb. 14, 2019, and entitled "Internet of Things Equipment and Use Cases," and U.S. Patent Provisional Application No. 62/852,556, filed on May 24, 2019, and entitled "Mobile Device Platform for Customized Arena Services," the entire contents of all three of which are fully incorporated by reference herein.

BACKGROUND

The term "Internet of Things" (IoT) is used to describe a connected network of devices that are capable of communicating among one another via one or more networks to accomplish various tasks. Individual of the devices can include user interfaces to enable users to interact with the devices, and thus, the other devices connected via the one or more networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
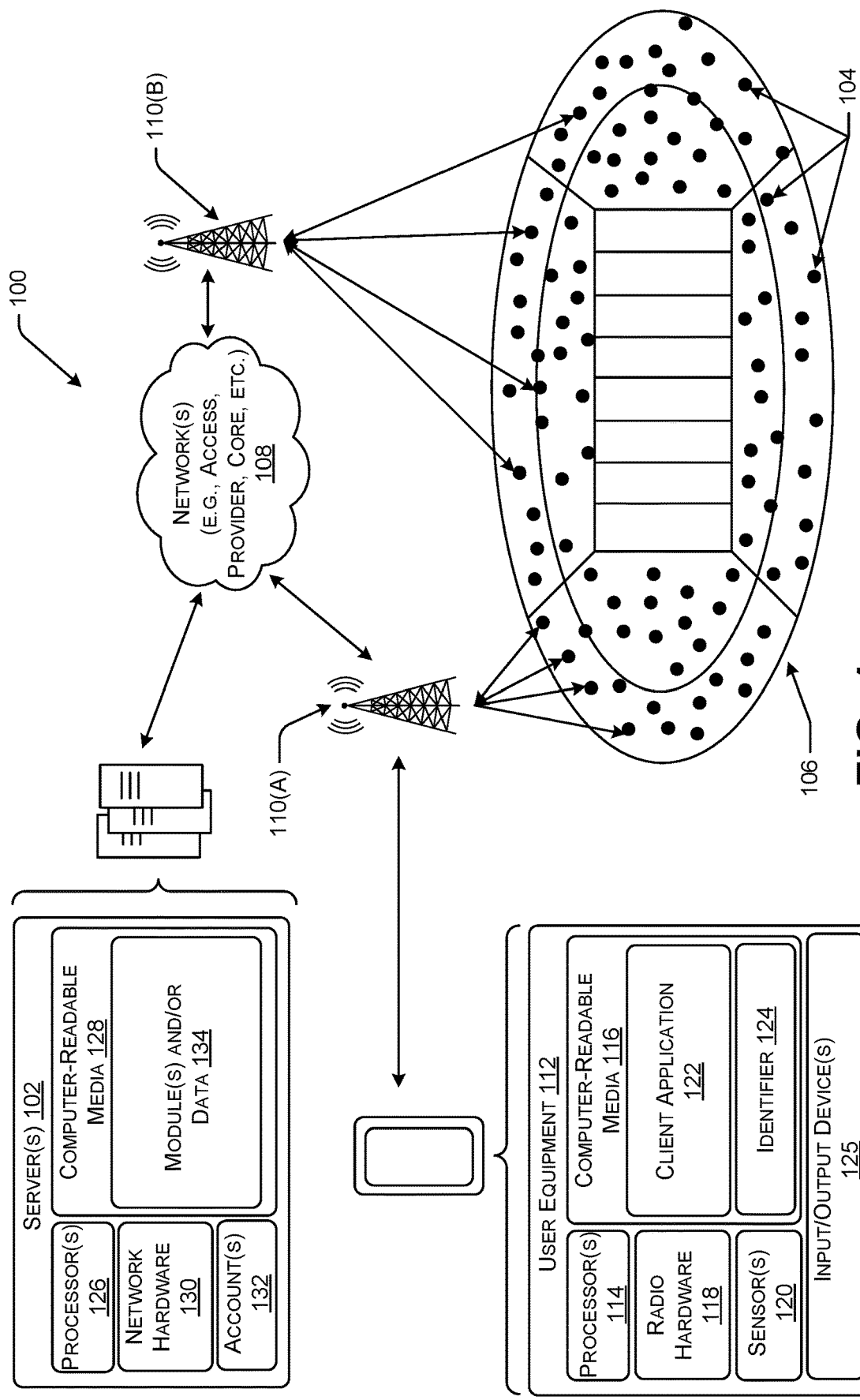
FIG. 1 illustrates an example IoT ecosystem for performing techniques described herein.

Techniques described herein are directed to utilizing networked devices to enhance user experience. In at least one example, techniques described herein are directed to the integration of a plurality of devices into a networked configuration to generate an "Internet of Things" (IoT) ecosystem. The IoT ecosystem can be used with aggregated data associated with a plurality of users of a service provider (e.g., a telecommunications service provider) to offer personalized and/or customized user experiences to users of the service provider, for instance, when user equipment (UE) operable by such users are located within or proximate to a facility associated with the service provider. That is, techniques described herein are directed to improving user experiences (e.g., offered by telecommunications service providers) using IoT sensor integration and data analytics.

The IoT ecosystem described herein can include sensors which can be communicatively coupled to one or more server computing devices via one or more networks. In at least one example, the sensors can be installed throughout a facility, such as an arena, a stadium, a park, a concert hall, a retail store, or other venue. The network sensors can be configured to search for beacon signals (e.g., sensor data), which can be emitted by UEs, such as mobile phones, tablets, wearable devices, and the like. In at least one example, the beacon signals can be emitted by UEs and detected by the network sensors using Internet of Things (IoT) signals and/or other Radio Frequency (RF) technologies such as Near Field Communications (NFCC), BLUETOOTH®, WiFi, Long-Term Evolution (LTE), Fifth Generation (5G), etc. IoT signals can include cellular signals such as 5G or LTE signals (e.g., LTE-M) or Narrowband IoT (NB-IoT) signals. IoT signals can also include BLUETOOTH® signals (e.g., Bluetooth Low Energy (BLE)), radio frequency identification (RFID) signals, NFC signals, or signals for a Wireless Personal Area Network (WPAN), Wireless Local Area Network (WLAN), or Wireless Wide Area Network (WWAN). Examples of a WWAN include LoRaWAN and SigFox. Examples of a WPAN include ZigBee and Z-Wave. In some examples, one or more beacons can transmit reference signals that are received by UEs, which can then report the information received from the beacon(s) to the server computing devices via the one or more networks. In such examples, the information reported by the UEs can be used by the one or more networks for performing techniques described herein. In at least one example, combinations of UEs emitting beacon signals and receiving and reporting beacon signals can be used in association with techniques described herein. Additional details associated with sensors, signals, networks, and the IoT ecosystem are described below with reference to FIGS. 1 and 2.

Numerous network sensors can be placed throughout the facility and can be in communication with one or more server computing devices. The placement of numerous sensors throughout the facility can allow the detection of the presence of UEs and/or the determination of locations of UEs within the facility to be determined by the one or more server computing devices. For example, a location of a UE within or proximate to the facility can be determined based on which network sensor(s) pick up its beacon signal, in some cases using time-of-arrival analysis. For example, the beacon signal can include a timestamp indicating a time at which it was sent, such that if a first network sensor receives the beacon signal relatively close to that time and a second network sensor receives the beacon signal later on, the network can determine that the UE is closer to the first network sensor's location. Additional or alternative techniques can be used to determine a presence of a UE in a facility and/or a location of a UE within or proximate to the facility, as described below. For the purpose of this discussion, a location of a UE can refer to an approximate location.

In some examples, network sensors can be arranged in sensor arrays, which can be used to increase location accuracy. For example, sensor arrays can measure angles at which beacon signals are received, in addition to times of arrival. Time difference of arrival techniques can be used with a fully synchronized network of sensors.

In at least one example, the one or more server computing devices can be associated with a service provider providing, among other services, telecommunications services. In at least one example, the UEs can be associated with user accounts. A user account, for example, can include purchase history of the user account (e.g., of items provided by the service provider and/or third-party service provider(s)), search history associated with the user account, a billing history associated with the user account, a subscription tier associated with the user account, services associated with the user account, a number of lines associated with the user account, or devices associated with the user account. In at least one example, a user account can enable a user to utilize wireless telecommunications services of the service provider via a UE.

In some examples, techniques described herein can utilize the IoT ecosystem to provide differentiated services to users located at or near facilities, which can be associated with the service provider. As described herein, the IoT ecosystem can be utilized to enhance user experiences in facilities. In at least one example, such enhancements can be achieved using data analytics. That is, data, which in some examples can be associated with the service provider, can be used to intelligently make decisions regarding how to provide customized and/or personalized services to users of the service provider while the users are located at or near facilities. For example, techniques described herein can utilize a user account (and, in some examples, data analytics) to determine to modify a distribution of network technology, thereby temporarily enabling a user (e.g., a UE associated therewith) to access at least one service that is not otherwise available to at least one other user in a facility. In at least one example, techniques described herein can modify the distribution of network technology by modifying one or more of a network function, a network resource, or a relationship between network connections. That is, techniques described herein can design, instantiate, and/or operate aspects of the IoT ecosystem in a dynamic "on-demand" basis, enabling customized and/or personal user experiences. At least some of the differentiated services can be availed via "network slicing," for example, of 5G radio access technology. Additional details are described below. In at least one example, access provisioned by the modification of the distribution of the network technology can be temporary such that after a user leaves a facility (e.g., the UE is not detected within or proximate to the facility) access is terminated, after a predetermined period of time access is terminated, after a user provides an indication to terminate the access, the access is terminated and so on.

In at least one example, the beacon signals from the UEs can include information such as, but not limited to, frequency, transmission power, an identifier, etc. In at least one example, such information can be useful for determining locations of UEs (e.g., using a path loss formula, etc.). Further, in some examples, the information can be useful for identifying a UE (e.g., if the identifier is a user identifier). Accordingly, in addition to determining a location of a UE within the facility, the one or more server computing devices can also identify a user and/or user account associated with a particular UE. For example, a user of the UE can be logged in to an application associated with their account with the service provider. That application can cause the UE to emit beacon signals that include an identifier linked to the user's account. In at least one example, the one or more server computing devices can access an account of a user to access account data associated therewith.

Identities of users present in facilities (e.g., which can be determined from account data associated therewith) can be used for personalizing and/or customizing user experiences, as described below. For example, machine learning or other predictive algorithms can use historical data tracked about such identified users to identify where they may go next within the facility, what they might want to buy, etc. Accordingly, in at least one example, users can be provided with offers based on predictions made from such historical data. For instance, if a particular user attends events at a facility often and the network sensors have identified his UE often in line for food at a taco booth, the one or more server computing devices can cause the application to give the user a promotional offer for a free taco, instruct personnel at the taco booth to give the user a free taco when they arrive, deliver a taco to the user upon arrival, or the like.

In at least one example, the one or more server computing devices associated with the service provider can receive data from numerous network sensors throughout the facility to track locations of UEs and identify users of the service provider that are associated with those UEs, as described above. In additional or alternative examples, the one or more server computing devices can use this data to enhance the user experience for users associated with recognized UEs. For instance, the one or more server computing devices can analyze how users are using the facility. For example, by tracking locations of multiple UEs within the facility, the one or more server computing devices can analyze how long users are standing in line for specific food booths or for specific bathrooms at known locations within the facility, or how long it is taking users to enter the facility (e.g., via an entry), exit the facility (e.g., via an exit), find parking in a parking garage, or leave the parking garage. This data can then be provided to UEs via an application, for instance, by providing estimated wait times for entities associated with the facility, such as vendors (e.g., food booths, merchandise booths, etc.), bathrooms, entries, exits, parking garages, and the like. Additional details are described below.

The one or more server computing devices can also use the data to provide other services to users via an application, for example. For example, a user attending a sporting event at an arena where the network sensors have been installed can open an application on their UE. The application can cause beacon signals to be emitted so that the one or more server computing devices can track the location of the UE and identify the user. Based on the one or more server computing devices knowing the user's identity and location, the one or more server computing devices can provide data to the application so that the application can display a map of the facility that allows the user to locate his seat, find friends based on the detected locations of the friends' UEs, or find shops, bathrooms, mascots, or other places or items of interest within the facility.

When the facility is an arena or stadium for sporting events, detection of the UEs via the network sensors installed at the facility can also allow the one or more server computing devices to provide, through the application on the UE, game videos, team statistics, videos or highlights, and other features. For example, 5G millimeter wave technology can be used to send HD and/or multi-angle video to the application on the UE. This video can include video captured from cameras at individual locations, or synthesized video generated from a mixture of cameras at different locations. For example, three-dimensional (3D) or augmented reality (AR) video can be generated from a camera on a baseball catcher's helmet as well as at the pitcher's mound, such that the user sees video that appears to have been taken between home plate and the pitcher's mound.

The application on the UE can enable users to perform various other operations. For example, the application can allow identified users to vote or bet on winners of the game, who will be named the player of the game, etc.

Additionally, when a room or entrance is available to a subset of people at a facility (e.g., users of the service provider, users with a particular service plan and/or level, VIPs, influencers, etc.), the one or more server computing devices can identify UEs associated with those people using techniques described above. This identification data can be provided to ushers or other personnel, so that identified users can be allowed into the room or entrance. Similarly, the one or more server computing devices can instruct doors to rooms or entrances to open or unlock automatically when a UE of a qualifying user is detected nearby.

Moreover, when network sensors detect a location of a UE and access associated user information, the application on the UE can allow users to order item(s) (e.g., services, goods (e.g., food, merchandise, etc.), etc.) for pickup or delivery. When delivery is selected, the location of the UE (as detected via the network sensors) can be shared with facility personnel so that the food/merchandise can be delivered to a location of the UE, for instance at the user's seat or anywhere else within or proximate to the facility. In such an example (and for use in other examples), NFC (or other RF technology) transponder tags can be attached to seats in a venue, which can be read by the UE to help identify the location of the UE. Such information can be communicated with the order to enable the facility personnel to deliver the food/merchandise to the location of the UE. In another example, a robot or unmanned aerial vehicle can deliver the item(s) to a location of the UE. Accordingly, the network sensors throughout the facility and the one or more server computing devices can allow users of the service provider to avoid lines for food/merchandise. Furthermore, techniques described herein can also offer other features, such as social network integration, translation, or other disability-friendly services within the facility.

Techniques described herein are directed to improvements over traditional telecom networks. For example, traditional telecom networks have been built with physical nodes, providing a "monolithic" network that is statically configured, manually managed, and in a "single tenant environment." Such traditional telecom networks do not allow for the high degree of flexibility and agility required for providing customized and/or personalized services to different users, within a close proximity. As described above, techniques described herein can utilize the IoT ecosystem to provide differentiated services to users located at or near facilities. In at least one example, techniques described herein can utilize a user account (and, in some examples, data analytics) to determine to modify a distribution of network technology to temporarily enable a user to access at least one service that is not otherwise available to at least one other user in a facility. In at least one example, the distribution of network technology can be modified by modifying one or more of a network function, a network resource, or a relationship between network connections. For the purpose of this discussion, a network function can be a functional building block within a network infrastructure that provides one or more functions of a network, such as routing, load-balancing, etc. A network resource can be a component (e.g., hardware, software, data, etc.) of a network infrastructure, such as an end-point, an instance of an application associated with a particular end-point, a base station, server(s), etc. Network connections can refer to data links between network resources.

In at least one example, modifications can be achieved by "network slicing." Such modification and/or "network slicing" can enable the flexible and agile design, instantiation, and/or operation of aspects of the IoT ecosystem in a dynamic "on-demand" basis, enabling customized and/or personal user experiences. This enables techniques described herein to modify performance requirements (e.g., latency, throughput, reliability, coverage, etc.), functional requirements, operational requirements, etc. of different users to provide customized and/or personal user experiences as described herein.

FIG. 1 illustrates an example IoT ecosystem 100 for performing techniques described herein. The IoT ecosystem 100 includes one or more server computing devices (e.g., server(s) 102) associated with a service provider that are in communication with network sensors 104. In at least one example, the network sensors 104 can be disposed around and/or within a facility 106. As described above, the facility 106 can be an arena, a stadium, a park, a concert hall, a retail store, or other venue, which, in some examples, can be associated with a service provider. While the network sensors 104 are illustrated as being within or proximate to the facility 106, in additional or alternative examples, the network sensors 104 can be disposed within and/or around the facility 106, as described above.

The network sensors 104 can include but are not limited to IoT sensors such as proximity sensors, infrared sensors, image sensors, motion detection sensors, optical sensors, temperature sensors, pressure sensors, accelerometer sensors, gyroscope sensors, chemical sensors, and the like. In at least one example, the network sensors 104 can be associated with RF technologies, such as, NFC, BLUETOOTH®, WiFi, LTE, 5G, etc., which can receive and/or emit cellular signals such as 5G or LTE signals (e.g., LTE-M) or Narrowband IoT (NB-IoT) signals, BLUETOOTH® signals (e.g., BLE), RFID signals, NFC signals, or signals for a WPAN, WLAN, or WWAN. As described above, Examples of a WWAN include LoRaWAN and SigFox. Examples of a WPAN include ZigBee and Z-Wave. The network sensors 104 can include global positioning system (GPS) sensors for providing position, navigation, and/or timing data. The network sensors 104 can include cameras or other image capturing devices, biometric identification devices, and the like. Furthermore, in some examples, the network sensors 104 can include audio sensors for capturing sound. The network sensors 104 can be any other type of sensor that can be used for determining characteristics of an environment.

In at least one example, individual of the network sensors 104 can communicate with the server(s) 102 via network(s) 108. The network(s) 108 can include access network(s) (e.g., network(s) that connect subscribers (e.g., UEs associated therewith) to a service provider (e.g., a telecommunications service provider)), provider network(s), a core network (which, in some examples can be a "carrier" network) (e.g., that connects one or more other service providers to one another), etc. In some examples, individual of the network sensors 104 can communicate with the server(s) 102 via base station(s) 110 and/or other components associated with the network(s) 108. A base station (e.g., base station 110A, base station 110B), which can also be known as a cell site or cell tower, can be associated with antennae and other electronic communications equipment (e.g., transceivers, digital signal processors, control electronics, a GPS receiver, etc.) to create a cell in a cellular network.

In at least one example, the IoT ecosystem 100 can include one or more UEs, such as UE 112, which can be operable by users. For the purpose of this discussion, actions attributed to a "user" can be performed by or through interaction with a corresponding UE, such as the UE 112. In at least one example, the UE 112 can be a computing device such as a smart phone, a personal digital assistant, a netbook, a tablet, a laptop computer, a smart appliance, a wearable device, and/or another electronic device that is capable of transmitting or receiving audio, video, and/or data via the network(s) 108. In at least one example, the UE 112 can communicate with the one or more server(s) 102 via the network(s) 108 (and/or the base stations 110). Furthermore, in at least one example, the UE 112 can emit beacon signals, which can be received by the network sensors 104, as described above. In some examples, one or more beacons can transmit reference signals that are received by UEs, such as the UE 112. In such examples, the UE 112 can report the information received from the beacon(s) to the server(s) 102 via the network(s) 108.

The UE 112 can include one or more components, such as processor(s) 114, computer-readable media 116, radio hardware 118, and sensor(s) 120. While a single UE is illustrated, in practice, a plurality of UEs can be incorporated into the IoT ecosystem 100.

The processor(s) 114 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 114 can execute one or more modules and/or processes to cause the UE 112 to perform a variety of functionalities, as set forth above and explained in further detail in the following disclosure. Additionally, each of the processor(s) 114 can possess its own local memory, which also can store program modules, program data, and/or one or more operating systems.

Depending on the exact configuration and type of the UE 112, the computer-readable media 116, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 116 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the UE 112. Any such non-transitory computer-readable media can be part of the UE 112.

In contrast, communication media includes computer readable instructions, data structures, program modules, or other data in a modulated data signal, such as a carrier wave, or other transmission mechanism. As defined herein, computer storage media does not include communication media.

The computer-readable media 116 can include one or more modules and data structures including, for example, a client application 122 and an identifier 124. The one or more modules and data structures can be in the form of stand-alone applications, productivity applications, an operating system component, or any other application or software module configured to facilitate techniques as described herein.

The client application 122 can be configured to present a user interface to enable a user of the UE 112 to interact with the service provider associated with the server(s) 102. In at least one example, the client application 122 can enable a user to order and/or make purchases, for example, of tickets, food, merchandise, services, etc. Additionally or alternatively, the client application 122 can present a map (e.g., associated with a navigation service) to enable a user to navigate the facility 106, for example, to locate his or her seat, to meet up with a friend, or to navigate to a location of interest (e.g., shops, bathrooms, mascots, etc.). Further, in at least one example, the client application 122 can receive speech input and/or output audible instructions (e.g., associated with a navigation service) to enable a user to navigate around the facility 106, for example, to locate his or her seat, to meet up with a friend, or to navigate to a location of interest (e.g., shops, bathrooms, mascots, etc.).

In at least one example, the client application 122 can present content (e.g., associated with a content service) to enable a user to access game videos, statistics, highlights, or other features. The client application 122 can enable a user to vote or bet on winners of the game, who will be named the player of the game, etc. The client application 122 can also offer other features, such as social network integration, translation, or other disability-friendly services within or proximate to the facility 106. In some examples, the client application 122 can enable a user to access AR functionality, which enables the user to view events via a composite view presented via the UE 112 (e.g., view a ball trajectory, view an upcoming song, etc.), view and/or create messages that include AR features, participate in games within or proximate to the facility 106 using AR (e.g., scavenger hunt, etc.), and so on. For the purpose of this discussion, AR refers to a technology that superimposes a computer-generated (e.g., virtual) image on a user's view of the real world, providing a composite view.

The client application 122 additionally or alternatively can present a graphical user interface that presents at-a-glance views of performance indicators relevant to a particular user's use of the client application 122 and/or services of the service provider and/or other users' use of the services of the service provider. In some examples, the client application 122 can present recommendations, advertisements, or other communications (e.g., wait times, etc.) via the UE 112. Furthermore, in at least one example, the client application 122 can enable the user access to a room or entrance of the facility 106.

Additional or alternative details associated with the client application 122 are described below. However, while the preceding paragraphs make reference to the client application 122, in additional or alternative examples, the same or similar functionality can be accessible via another access point such as a web browser or the like.

In at least one example, when a user acquires a computing device, such as the UE 112, a wireless service provider or network provider can assign an International Mobile Subscriber Identity (IMSI) and/or an E.164 address (e.g., up to a fifteen-digit telephone number) that is specific for the user associated with the UE. As used herein, a "device number" is the E.164 address or identity assigned (such as an IMSI, or a Mobile Station International Subscriber Directory Number, MSISDN) to the UE by the wireless service provider or network provider. In some examples, the identifier 124 can be an IMSI. In other examples, the identifier 124 can be any other code or configuration that can be used to identify the UE 112 and/or a user associated therewith.

The radio hardware 118 provides wireless UE capabilities, such as connecting to a base station (e.g., the base station 110(A)) associated with the network(s) 108. The radio hardware 118 can include or be incorporated into processors, ASICs, programmable circuits such as FPGAs, or in other ways. In at least one example, the radio hardware 118 can include radios associated with one or more radio access technologies (e.g., 2G, 3G, 4G, 5G, etc.). The UE 112 can include additional or alternative hardware to enable the device to access the network(s) 108 via additional or alternative radio access technologies (e.g., BLUETOOTH®, WiFi, etc.).

In at least one example, the sensor(s) 120 can include a GPS sensor able to indicate location information. Further, the sensor(s) 120 can include, but are not limited to, an accelerometer, gyroscope, compass, proximity sensor, camera, microphone, and/or a switch. In at least one example, the sensor(s) 120 can, in addition to performing other tasks, emit beacon signal(s), which can be detected by individual of the network sensors 104. For example, as described above, beacon signals can be emitted by UEs and detected by the network sensors 104 using IoT signals and/or other RF technologies such as NFC, BLUETOOTH®, WiFi, LTE, 5G, etc. IoT signals can include cellular signals such as 5G or LTE signals (e.g., LTE-M) or Narrowband IoT (NB-IoT) signals. IoT signals can also include BLUETOOTH® signals (e.g., BLE), RFID signals, NFC signals, or signals for a WPAN, WLAN, or WWAN. Examples of a WWAN include LoRaWAN and SigFox. Examples of a WPAN include ZigBee and Z-Wave. In some examples, one or more beacons can transmit reference signals that can be received by the sensor(s) 120, and the UE 112 can report the information received from the beacon(s) to the server(s) 102 via the network(s) 108.

The UE 112 can include input/output device(s) 125. In at least one example, the input/output device(s) 125 can include a display, which can output information in a pictorial (or, in some examples, tactile) form. The display can be an electroluminescent display, liquid crystal display, a light-emitting diode display, plasma display, quantum dot display, etc. In some examples, the display can be a touch display, whereby touch of the display is an input method. In at least one example, the input/output device(s) 125 can include a speaker, a microphone, a stylus, a mouse, a keyboard, or the like. For the purpose of this discussion, a user can interact with the UE 112 via the input/output device(s) 125. That is, a user can provide touch input, speech input, etc. to interact with the UE 112. Similarly, the UE 112 can output information to the user via presentation on a display, audible output, etc.

In at least one example, the UE 112 can emit signals, which can be detected by network sensors 104, as described above. Additionally or alternatively, the UE 112 can exchange data and/or other communications with the server(s) 102, via the networks.

The server(s) 102 can include one or more components, such as processor(s) 126, computer-readable media 128, network hardware 130, and account(s) 132.

The processor(s) 126 can represent, for example, a CPU-type processing unit, a GPU-type processing unit, a FPGA, another class of DSP, or other hardware logic components that can, in some instances, be driven by a CPU. For example, and without limitation, illustrative types of hardware logic components that can be used include ASICs, ASSPs, SOCs, CPLDs, etc. In at least one example, an accelerator can represent a hybrid device, such as one from ZYLEX or ALTERA that includes a CPU course embedded in an FPGA fabric. In various embodiments, the processor(s) 126 can execute one or more modules and/or processes to cause the server(s) 102 to perform a variety of functionalities, as set forth above and explained in further detail in the following disclosure. Additionally, each of the processor(s) 126 can possess its own local memory, which also can store program modules, program data, and/or one or more operating systems.

Depending on the exact configuration and type of the server(s) 102, the computer-readable media 128, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to RAM, SRAM, DRAM, PRAM, ROM, EPROM, CD-ROM, DVDs, optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 128 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server(s) 102. Any such non-transitory computer-readable media can be part of the server(s) 102.

In contrast, communication media includes computer readable instructions, data structures, program modules, or other data in a modulated data signal, such as a carrier wave, or other transmission mechanism. As defined herein, computer storage media does not include communication media.

The computer-readable media 128 can include one or more modules and data 134, which are described with additional detail in FIG. 2, below. The one or more modules and data structures can be in the form of stand-alone applications, productivity applications, an operating system component, or any other application or software module configured to facilitate techniques as described herein.

The network hardware 130 can provide wired or wireless networking capabilities to the server(s) 102. The network hardware 130 can include or be incorporated into processors, ASICs, programmable circuits such as FPGAs, or in other ways.

The account(s) 132 can be stored locally with the server(s) 102 (as illustrated) and/or be stored remotely and be accessible to the server(s) 102. The account(s) 132 can store data associated with users (which can also be referred to as "subscribers" or "customers"), including but not limited to, data associated with user identities corresponding to account holders associated with UEs, phone numbers of the account holders, address books of the account holders, contacts of the account holders, text messages sent and received via the UEs, identity and/or service plan profiles (e.g., amount of data, voice calling, and/or text messaging available, whether data, voice calling, and/or text messaging is available internationally, data transmission speeds accessible, plan restrictions, etc.), etc. In at least one example, an account can additionally or alternatively include purchase history of the user account, a search history associated with the user account, a billing history associated with the user account, a subscription tier associated with the user account, services associated with the user account, a number of lines associated with the user account, or devices associated with the user account. In at least one example, a user account can enable a user to utilize wireless telecommunications services of the service provider, as described above.

While FIG. 1 illustrates a stadium as the facility 106, techniques described herein can be applicable to additional or alternative venues, as described above. For instance, when the facility 106 is a retail store of a company, the network sensors 104 can identify when UEs associated with the company enter the store. For example, when the network sensors 104 and server(s) 102 are operated by a service provider, beacon signals emitted by UEs of that service provider's users can be picked up by the network sensors 104 when the UEs enter the retail store. This can allow the server(s) 102 to identify a UE, such as the UE 112, and/or a corresponding user account, such that the server(s) 102 can provide that information to retail representatives. For instance, the server(s) 102 can identify the UE 112 associated with a known user from beacon signals picked up by network sensors 104 in the store, and provide account data to a device operated by a retail representative, such as providing a purchase history, a current bill, how many lines are on the user's service account, whether the user associated with the identified UE is the main account holder, how much the user spends per month on average, and/or any other information.

As an example, when a wireless carrier's customer comes into a retail store run by that wireless carrier, beacon signals from the customer's UE can be detected by network sensors 104 in the store. The server(s) 102 can cross check identifiers in the beacon signal against user accounts, plans, or experiences, so that retail representatives can provide the customer with personalized service. For example, the server(s) 102 can identify that the customer has bought a new UE or has moved to a new area, and can provide a prediction to retail representatives as to why the customer is visiting the retail store. The retail representatives can then provide recommendations or other information to the customer proactively, such as "We will help you change your device settings to utilize the maximum potential of our network," or "We will have a new cell tower site being built around your area in the next few months."

Figure 2:
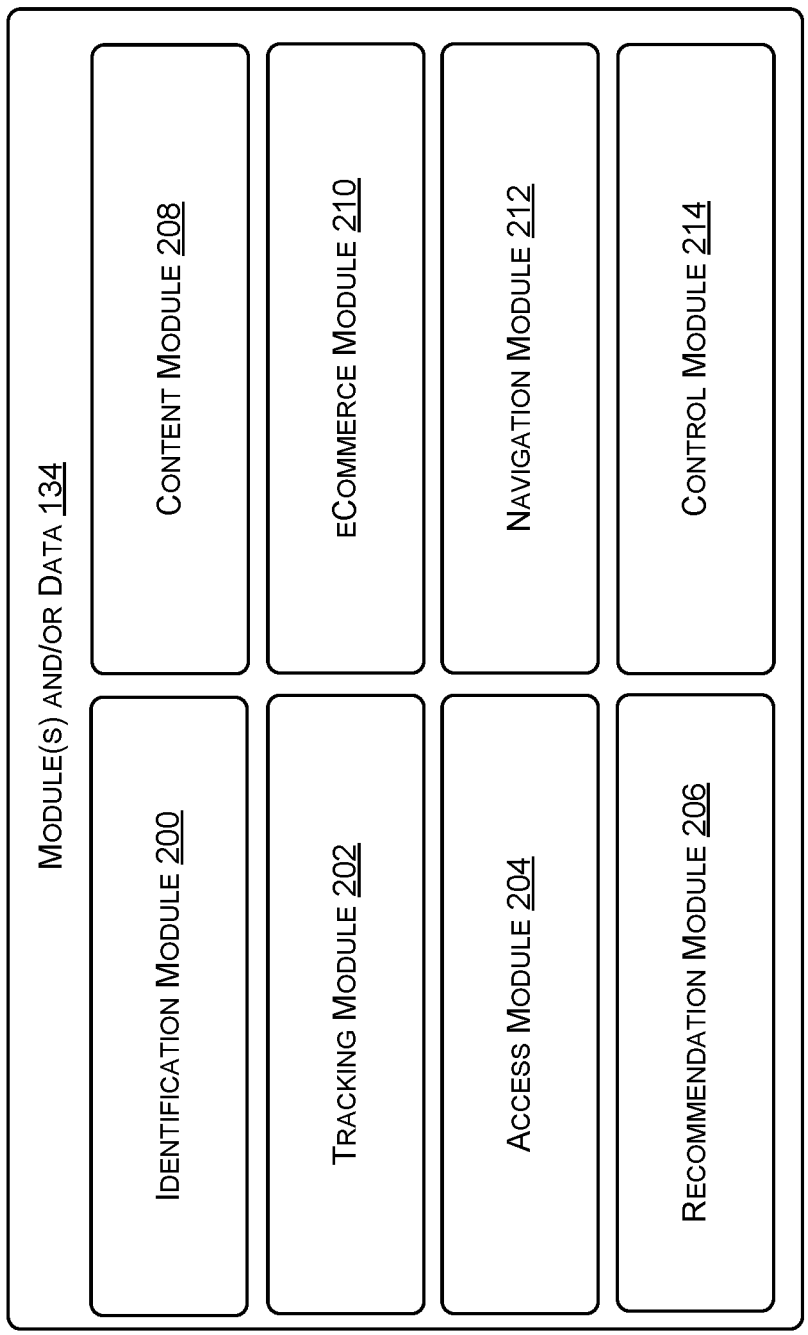
FIG. 2 illustrates additional details associated with FIG. 1.

FIG. 2 illustrates additional details associated with the module(s) and/or data 134 described above with reference to the server(s) 102 in FIG. 1. In at least one example, the module(s) and/or data 134 can include an identification module 200, a tracking module 202, an access module 204, a recommendation module 206, a content module 208, an ecommerce module 210, a navigation module 212, and a control module 214. In some examples, the module(s) and/or data 134 can be stored on the server(s) 102, for example, as illustrated in FIG. 1. However, in additional or alternative examples, the module(s) and/or data 134 can be distributed across one or more devices associated with the service provider. For example, in some examples, at least some of the functionality described below with respect to the module(s) and/or data 134 can be located on one or more base stations 110 and/or individual sensors of the network sensors 104. Furthermore, in some examples, at least some of the functionality can be associated with the client application 122.

The identification module 200 can identify the presence of UEs in a facility, such as the facility 106, and/or identify users associated with such UEs. In at least one example, the identification module 200 can receive GPS data from UEs. The identification module 200 can compare GPS data of a UE, such as the UE 112, with a geofence or known location of the facility 106. If the GPS data of the UE 112 is within the geofence and/or within a threshold distance of the known location of the facility 106, the identification module 200 can determine a presence of the UE 112 within or proximate to the facility 106. Furthermore, in some examples, the GPS data can be used to determine a location of the UE 112 within or proximate to the facility 106.

In some examples, a user can scan a code, such as a barcode, Quick Response (QR) code, etc. using their UE 112. The code can be associated with the facility 106 such that upon receiving an indication of a scan of the code, the identification module 200 can determine a presence of the UE 112 within or proximate to the facility 106. Further, as described above, in some examples, NFC (or other RF technology) transponder tags can be attached to seats, or other locations, in a venue, which can be read by the UE to help identify the location of the UE. Such information can be communicated to the identification module 200 and can be used by the identification module 200 to determine a presence of the UE 112 within or proximate to the facility 106. In an additional or alternative example, a user can check-in, for example, via a social media application or the like, at the facility 106. Responsive to receiving an indication of the check-in, the identification module 200 can determine a presence of the UE 112 within or proximate to the facility 106. In some examples, the indication of the scan of the code and/or the check-in can be associated with location data that can be used to determine a presence of the UE 112 within or proximate to the facility 106 and/or a location of the UE 112 within or proximate to the facility 106.

Furthermore, in some examples, the identification module 200 can determine a presence of the UE 112 within or proximate to the facility 106 using beacon signals. As described above, in at least one example, the sensor(s) 120 can, in addition to performing other tasks, emit beacon signal(s), which can be detected by individual of the network sensors 104. For example, as described above, beacon signals can be emitted by UEs and detected by the network sensors 104 using IoT signals and/or other RF technologies such as NFC, BLUETOOTH®, WiFi, LTE, 5G, etc. IoT signals can include cellular signals such as 5G or LTE signals (e.g., LTE-M) or Narrowband IoT (NB-IoT) signals. IoT signals can also include BLUETOOTH® signals (e.g., BLE), RFID signals, NFC signals, or signals for a WPAN, WLAN, or WWAN. Examples of a WWAN include LoRaWAN and SigFox. Examples of a WPAN include ZigBee and Z-Wave.

In such an example, the network sensors 104, which can be placed throughout the facility 106 and can be in communication with the server(s) 102, can allow the detection of the presence of UEs and/or the determination of location of UEs within or proximate to the facility 106 to be determined by the server(s) 102. For example, a location of a UE, such as the UE 112, can be determined based on which network sensor(s) 104 pick up its beacon signal, in some cases using time-of-arrival analysis. For example, the beacon signal can include a timestamp indicating a time at which it was sent, such that if a first network sensor receives the beacon signal relatively close to that time and a second network sensor receives the beacon signal later on, the network can determine that the UE is closer to the first network sensor's location.

In some examples, one or more beacons can transmit reference signals that can be received by the sensor(s) 120, and the UE 112 can report the information received from the beacon(s) to the server(s) 102 via the network(s) 108. In such examples, the identification module 200 can receive the reported information, which can be used to determine the presence and/or location of the UE 112.

In at least one example, in addition to determining the presence and/or location of UEs, the identification module 200 can identify users associated with identified UEs. For example, in at least one example, the beacon signals from the UEs can include an identifier, such as a user identifier. Accordingly, in addition to determining a UE's location within the facility, the identification module 200 can also identify a user and/or user account associated with a particular UE. For example, a user of a UE 112 can be logged in to the client application 122 associated with their account with the service provider. The client application 122 can cause the UE 112 to emit beacon signals that include an identifier linked to the user's account.

Furthermore, in some examples, an indication of a scan of the code and/or a check-in can be associated with identification data that can be used to identify a user. In additional or alternative examples, at least some of the network sensors 104 can be associated with cameras, speakers, or other devices that can be used for performing voice or facial recognition. That is, such network sensors 104 can detect speech input or visual input (e.g., image, video, etc.) and can process the input, for instance using automatic speech recognition technologies, computer vision technologies, etc., to identify a user associated with a particular UE.

In at least one example, responsive to determining an identity of a user, the identification module 200 can access the account(s) 132 to access data associated with the user.

The tracking module 202 can track the locations of UEs within or proximate to the facility 106 over time. That is, the tracking module 202 can receive location data and/or beacon signals (or indications associated therewith) indicative of locations of UEs within or proximate to the facility 106. The tracking module 202 can receive updated location data and/or beacon signals (or indications associated therewith) indicative of locations of UEs within or proximate to the facility 106 over time. As time progresses, the tracking module 202 can track the movement of individual UEs throughout the facility 106.

In at least one example, such data can be analyzed to determine characteristics associated with the facility 106 and/or locations within or proximate to the facility 106. For example, tracking data can indicate how users are moving within or proximate to the facility 106, where users are waiting in lines, how quickly the lines are moving, and so on. As an example, the server(s) 102 can analyze how users are using the facility 106. For instance, by tracking locations of multiple UEs within or proximate to the facility 106, the tracking module 202 can analyze how long users are standing in line for specific food booths or for specific bathrooms at known locations within the facility, or how long it is taking users to enter the facility, exit the facility, find parking in a parking garage, or leave the parking garage. This data can then be provided to UEs via respective instances of the client application 122, for instance, by providing estimated wait times for entities associated with the facility, such as vendors (e.g., food booths, merchandise booths, etc.), bathrooms, entries, exits, parking garages and the like.

The access module 204 can grant access to particular services. For example, in at least one example, when a room or entrance is available to a subset of people within or proximate to the facility 106 (e.g., users of the service provider, users with a particular service plan and/or level, VIPs, influencers, etc.), the access module 204 can identify UEs associated with those people as indicated above. This identification data can be provided to ushers or other personnel (e.g., devices associated therewith), so that identified users can be allowed into the room or entrance. Similarly, the access module 204 can send an instruction to a computing device associated with a door or other mechanism to open or unlock automatically when a UE of a qualifying user is detected nearby (e.g., within a threshold distance thereof). In such examples, the access module 204 can additionally send an indication to the client application 122 to direct the user to the room or entrance.

The recommendation module 206 can generate and cause the presentation of recommendations to users within or proximate to the facility 106. Identities of UEs present in facilities can be used for personalizing and/or customizing user experiences, as described above. For example, machine learning or other predictive algorithms can use historical data tracked about such identified users to identify where they may go next within the facility, what they might want to buy, etc. Accordingly, in at least one example, the recommendation module 206 can generate a recommendation that can be presented to a user, which can be based on historical data (e.g., associated with that user, a group of similar users, a general population of users, etc.). For instance, as described above, if a particular user attends events at a facility often and the network sensors 104 have identified his UE often in line for food at a taco booth, the recommendation module 206 can generate a recommendation for the user to visit the taco booth. In some examples, the recommendation can be associated with an offer, a discount, an incentive, or the like. As another example, the recommendation module 206 can determine, from the historical data, that a particular user prefers a particular type of beverage. The recommendation module 206 can send a recommendation to the client application 122, which can include a recommendation to order the particular type of beverage or to try a new vendor offering the particular type of beverage.

The content module 208 can generate and serve content to the user, via the client application 122. In at least one example, the content module 208 can receive and/or generate content, which can be provided to the client application 122. The client application 122 can present the content via the UE 112. For example, the client application 122 can present content to enable a user to access game videos, statistics, highlights, or other features. For example, 5G millimeter wave technology can be used to send HD and/or multi-angle video to the client application 122 (e.g., via the content module 208). This video can include video captured from cameras at individual locations, or synthesized video generated from a mixture of cameras at different locations. For example, 3D or AR video can be generated from a camera on a baseball catcher's helmet as well as at the pitcher's mound, such that the user sees video that appears to have been taken between home plate and the pitcher's mound. In such examples, the content module 208 can receive and/or generate data associated with such game videos, statistics, highlights, or other features, which can be accessed by the client application 122.

As described above, the client application 122 can also offer other features, such as social network integration, translation, or other disability-friendly services within or proximate to the facility 106. In such examples, the content module 208 can facilitate the social network integration, translation, or other disability-friendly services.

In some examples, the client application 122 can enable a user to access AR functionality, which enables the user to view events via a composite view presented via the UE 112 (e.g., view a ball trajectory, view an upcoming song, etc.), view and/or create messages that include AR features, participate in games within or proximate to the facility 106 using AR (e.g., scavenger hunt, etc.), and so on. In at least one example, the content module 208 can generate AR content, which can be presented via the client application 122.

The client application 122 additionally or alternatively can present a graphical user interface that presents at-a-glance views of performance indicators relevant to a particular user's use of the client application 122 and/or services of the service provider and/or other users' use of the services of the service provider. In at least one example, the content module 208 can generate and/or maintain data associated with presenting such a graphical user interface.

The ecommerce module 210 can facilitate ecommerce transactions. In at least one example, one or more vendors, merchants, etc. can make their inventory available via the ecommerce module 210. At least a portion of the inventory can be presented to users via respective instances of the client application 122. In at least one example, a user can interact with the client application 122 to order one or more items. The ecommerce module 210 can receive the order and can transmit the order to the one or more vendors, merchants, etc. In some examples, the order can be an order for pick-up, which can be picked up by a user at a place of business of a vendor, merchant, etc. In other examples, the order can be an order for delivery, to a location specified by the user (e.g., the user's seat, another location within or proximate to the facility 106, etc.). In such examples, a facility personnel, a robot, an unmanned aerial vehicle (e.g., a drone), etc. can deliver item(s) in the order to the location specified by the user. As described above, in some examples, NFC transponder tags can be attached to seats, or other locations, in a venue, which can be read by the UE to help identify the location of the UE. Such information can be communicated with the order to enable the facility personnel, robot, unmanned aerial vehicle, etc. to deliver the food/merchandise to the location of the UE.

The navigation module 212 can utilize map data associated with the facility 106 to determine instructions for guiding a user to and/or between locations within or proximate to the facility 106. In at least one example, the navigation module 212 can utilize location data or other presence information to determine a current location of the UE 112. The navigation module 212 can determine an intended destination of a user, which can be a seat in the facility 106, a location of a friend, a location of interest (e.g., shops, bathrooms, mascots, etc.). In at least one example, the user can specify, via the client application 122, a location of interest. For example, a user can interact with a digital map to identify a location of interest. In another example, a user can provide speech input indicating a location of interest. In other examples, the navigation module 212 can infer a location of interest, for example, based on a ticket for an event at the facility 106, user preferences (which can be based on historical data, account data, etc.), etc.

The navigation module 212 can determine one or more instructions for guiding the user to the intended destination. In at least one example, such instructions can be sent to the client application 122 and can be output to the user, via the input/output device(s) 125 (e.g., display, speaker, etc.). In some examples, the instructions can include stops at particular locations associated with the service provider, which can include an incentive for stopping at said locations. In additional or alternative examples, the instructions can be associated with a game, such as a scavenger hunt, or other game that can be presented via a composite view (e.g., AR) output via the client application 122.

The control module 214 can determine modifications to a distribution of network technology to temporarily enable a user (e.g., UE associated therewith) to access at least one service that is not otherwise available to at least one other user in a facility. In at least one example, the control module 214 can effectuate modifications to the distribution of network technology by modifying at least one or more of a network function, a network resource, or a relationship between network connections. That is, the control module 214 can effectuate network slicing to enable dynamic, "on-demand," customized and/or personal user experiences.

In at least one example, the control module 214 can implement "network slicing" to facilitate the provisioning of differentiated services. For example, responsive to detecting a presence of the UE 112 within or proximate to the facility 106, and determining to provision at least one service to the UE 112 that is not otherwise available to at least one other user within or proximate to the facility 106 (e.g., based on account data), the control module 214 can modify the radio access technology through which the UE 112 access the network(s) 108. To provide the at least one service, the control module 214 can transition the UE 112 to a 5G radio access technology. As a result, the UE 112 can access more data in a shorter period of time (i.e., faster) than with other radio access technologies, even in sparse or densely populated areas. Thus, the UE 112 can access content services availed by the content module 208 and/or navigation services availed by the navigation module 212 with high levels of throughput (for both uplink and downlink data transmissions). Furthermore, in some examples, levels of spectrum can be sliced and tailored to handle performance requirements for a particular service. For example, different network slices can use different distributions models of network function and applications to optimize the topology through which data is transmitted for providing the particular service. Further, throughput can be allocated based on needs of the particular service. Moreover, different network slices can have different levels and/or types of availability and/or resilience, which can be determined based on needs of the particular service. In at least one example, resources associated with access infrastructure can be assigned to and/or used by different services, as determined by the control module 214.

The processes described below in association with FIGS. 3-8 can be implemented in hardware, software, or a combination thereof. The example processes are described in the context of the environment of FIGS. 1 and 2 but are not limited to that environment. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations can be combined in any order and/or in parallel to implement the processes.

Figure 3:
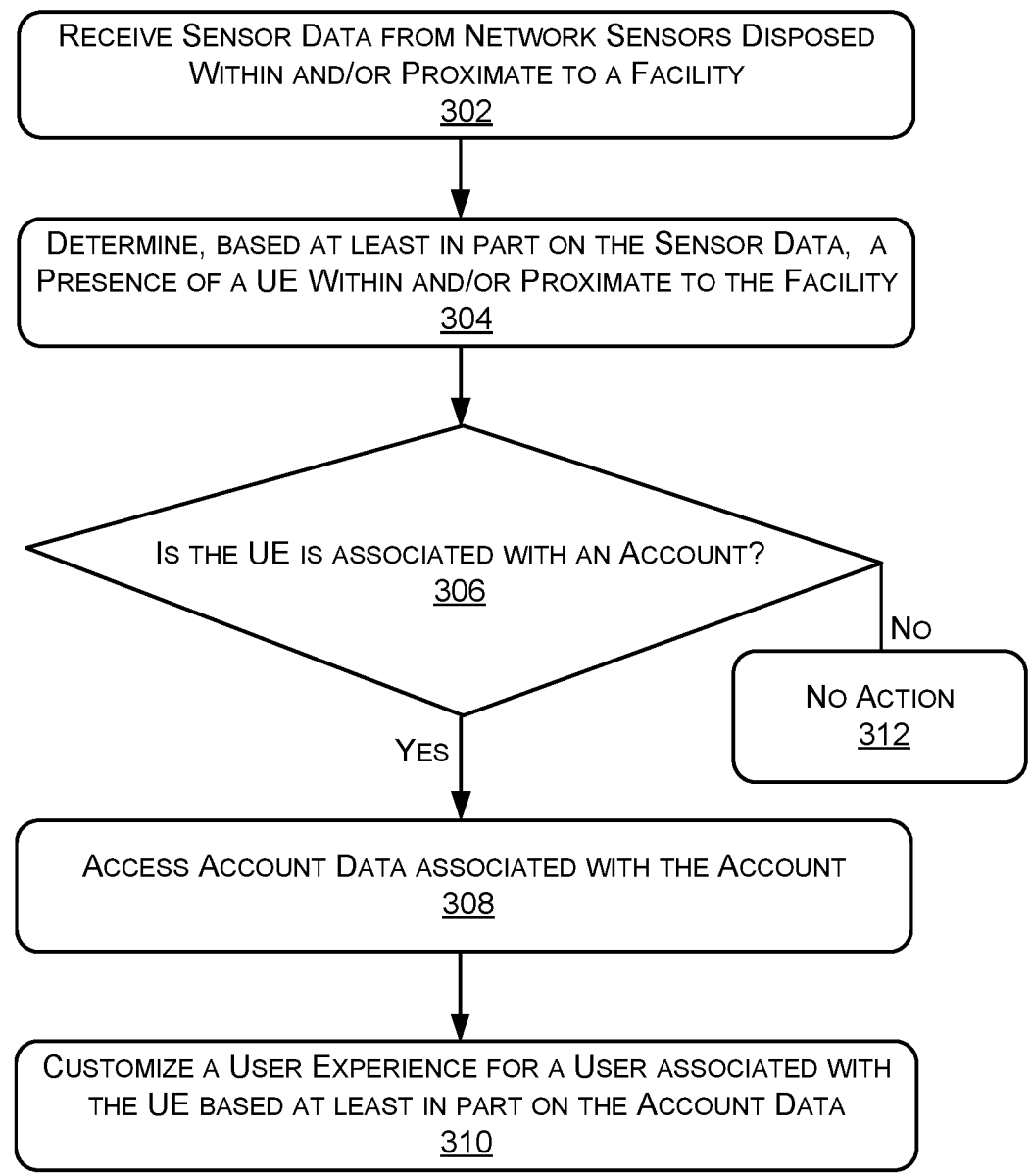
FIG. 3 illustrates an example process for customizing a user experience for a user while the user is within or proximate to a facility.

FIG. 3 illustrates an example process 300 for customizing a user experience for a user while the user is within or proximate to a facility.

Operation 302 illustrates receiving sensor data from network sensors disposed within and/or proximate to a facility. As described above, facilities, such as the facility 106, can have network sensors 104 disposed within and/or proximate to the facilities. The network sensors 104 can generate sensor data which can be transmitted from the network sensors 104 to the server(s) 102. In some examples, the sensor data can be transmitted to the servers(s) 102 directly. In other examples, the sensor data can be transmitted to the server(s) 102 via base station(s) 110 and/or another network resource (e.g., indirectly).

Operation 304 illustrates determining, based at least in part on the sensor data, a presence of a UE within or proximate to the facility. As described above, the identification module 200 can identify the presence of UEs in a facility, such as the facility 106. In at least one example, the identification module 200 can receive GPS data from UEs. The identification module 200 can compare GPS data of a UE, such as the UE 112, with a geofence or known location of the facility 106. If the GPS data of the UE 112 is within the geofence and/or within a threshold distance of the known location of the facility 106, the identification module 200 can determine a presence of the UE 112 within or proximate to the facility 106. Furthermore, in some examples, the GPS data can be used to determine a location of the UE 112 within or proximate to the facility 106.

In some examples, a user can scan a code, such as a barcode, QR code, etc. using their UE 112. The code can be associated with the facility 106 such that upon receiving an indication of a scan of the code, the identification module 200 can determine a presence of the UE 112 within or proximate to the facility 106. Further, as described above, in some examples, NFC (or other RF technology) transponder tags can be attached to seats, or other locations, in a venue, which can be read by the UE to help identify the location of the UE. Such information can be communicated to the identification module 200 and can be used by the identification module 200 to determine a presence of the UE 112 within or proximate to the facility 106. In an additional or alternative example, a user can check-in, for example, via a social media application or the like, at the facility 106. Responsive to receiving an indication of the check-in, the identification module 200 can determine a presence of the UE 112 within or proximate to the facility 106. In some examples, the indication of the scan of the code and/or the check-in can be associated with location data that can be used to determine a presence of the UE 112 within or proximate to the facility 106 and/or a location of the UE 112 within or proximate to the facility 106.

Furthermore, in some examples, the identification module 200 can determine a presence of the UE 112 within or proximate to the facility 106 using beacon signals. As described above, in at least one example, the sensor(s) 120 can, in addition to performing other tasks, emit beacon signal(s), which can be detected by individual of the network sensors 104. In such an example, the network sensors 104, which can be placed throughout the facility 106 and can be in communication with the server(s) 102, can allow the detection of the presence of UEs and/or the determination of location of UEs within or proximate to the facility 106 to be determined by the server(s) 102. For example, a location of a UE, such as the UE 112, can be determined based on which network sensor(s) 104 pick up its beacon signal, in some cases using time-of-arrival analysis. For example, the beacon signal can include a timestamp indicating a time at which it was sent, such that if a first network sensor receives the beacon signal relatively close to that time and a second network sensor receives the beacon signal later on, the network can determine that the UE is closer to the first network sensor's location. In some examples, one or more beacons can transmit reference signals that can be received by the sensor(s) 120, and the UE 112 can report the information received from the beacon(s) to the server(s) 102 via the network(s) 108. In such examples, the identification module 200 can receive the reported information, which can be used to determine the presence and/or location of the UE 112.

In at least one example, the identification module 200 can identify the presence of a UE 112 within or proximate to the facility 106 using one or more of the techniques described above.

Operation 306 illustrates determining whether the UE is associated with an account. In at least one example, in addition to determining the presence and/or location of UEs, the identification module 200 can identify users associated with identified UEs. For example, in at least one example, the beacon signals from the UEs can include an identifier, such as a user identifier. Accordingly, in addition to determining the location of the UE 112 within or proximate to the facility 106, the identification module 200 can also identify a user and/or user account associated with a particular UE. For example, a user of the UE 112 can be logged in to the client application 122 on the UE 112. The client application 122 can be associated with their account with the service provider. The client application 122 can cause the UE 112 to emit beacon signals that include an identifier linked to the user's account.

Furthermore, in some examples, an indication of a scan of the code and/or a check-in can be associated with identification data that can be used to identify a user. In additional or alternative examples, at least some of the network sensors 104 can be associated with cameras, speakers, or other devices that can be used for performing voice or facial recognition. That is, such network sensors 104 can detect speech input or visual input (e.g., image, video, etc.) and can process the input, for instance using automatic speech recognition technologies, computer vision technologies, etc., to identify a user associated with a particular UE.

In at least one example, responsive to determining an identity of a user, the identification module 200 can determine whether the UE is associated with an account. That is, in at least one example, the identification module 200 can perform a look-up and/or other search of the account(s) 132 to determine whether the UE 112, and associated identifier, are associated with an account of the account(s) 132.

Operation 308 illustrates accessing account data associated with the account. Based at least in part on determining that the UE 112 is associated with an account, the identification module 200 can access account data associated with the account. As described above, the account(s) 132 can be stored locally with the server(s) 102 (as illustrated in FIG. 1) and/or be stored remotely and be accessible to the server(s) 102. The account(s) 132 can store data associated with users (which can also be referred to as "subscribers" or "customers"), including but not limited to, data associated with user identities corresponding to account holders associated with UEs, phone numbers of the account holders, address books of the account holders, contacts of the account holders, text messages sent and received via the UEs, identity and/or service plan profiles (e.g., amount of data, voice calling, and/or text messaging available, whether data, voice calling, and/or text messaging is available internationally, data transmission speeds accessible, plan restrictions, etc.), etc. In at least one example, an account can additionally or alternatively include purchase history of the user account, a search history associated with the user account, a billing history associated with the user account, a subscription tier associated with the user account, services associated with the user account, a number of lines associated with the user account, or devices associated with the user account. In at least one example, a user account can enable a user to utilize wireless telecommunications services of the service provider, as described above.

Operation 310 illustrates customizing a user experience for a user associated with the UE based at least in part on the account data. As described above, techniques described herein can utilize the IoT ecosystem 100 to provide differentiated services to users located at or near facilities.

For example, the control module 214 can utilize the account data (and, in some examples, data analytics) to determine to modify a distribution of network technology, thereby temporarily enabling a user (e.g., a UE associated therewith) to access at least one service that is not otherwise available to at least one other user in a facility. In at least one example, the control module 214 can modify the distribution of network technology by modifying one or more of a network function, a network resource, or a relationship between network connections to avail a service to a user that is not otherwise available to at least one other user in a facility. Various examples of such services are described herein.

In at least one example, the tracking module 202 can receive data from numerous network sensors 104 throughout the facility 106 to track locations of UEs and identify users of the service provider that are associated with those UEs, as described above. In at least one example, by tracking locations of multiple UEs within or proximate to the facility 106, the tracking module 202 can analyze how long users are standing in line for specific food booths or for specific bathrooms at known locations within the facility, or how long it is taking users to enter the facility, exit the facility, find parking in a parking garage, or leave the parking garage. This data can then be provided to UEs via respective instances of the client application 122, for instance, by providing estimated wait times for entities associated with the facility, such as vendors (e.g., food booths, merchandise booths, etc.), bathrooms, entries, exits, parking garages and the like. That is, in at least one example, a notification service that notifies users of such information can be availed via the tracking module 202. In at least one example, the control module 214 can modify the distribution of network technology to avail such a service to the UE 112.

As described above, the recommendation module 206 can generate and cause the presentation of recommendations to users within or proximate to the facility 106. Identities of UEs present in facilities (e.g., the user account data) can be used for personalizing and/or customizing user experiences, as described above. For example, machine learning or other predictive algorithms can use historical data tracked about such identified users to identify where they may go next within the facility, what they might want to buy, etc. Accordingly, in at least one example, the recommendation module 206 can generate a recommendation that can be presented to a user, which can be based on historical data (e.g., associated with that user, a group of similar users, a general population of users, etc.). In some examples, the recommendation can be associated with an offer, a discount, an incentive, or the like. That is, the recommendation module 206 can avail a recommendation service to the user (e.g., the UE 112 associated therewith) while the user is within and/or proximate to the facility 106. The recommendation module 206 can send recommendations to the client application 122 and the client application 122 can cause the recommendation to be output via the UE 112. In at least one example, the control module 214 can modify the distribution of network technology to avail such a service to the UE 112.

In at least one example, the access module 204 can grant access to particular services. For example, in at least one example, when a room or entrance is available to a subset of people within or proximate to the facility 106 (e.g., users of the service provider, users with a particular service plan and/or level, VIPs, influencers, etc.), the access module 204 can identify UEs associated with those people as indicated above. This identification data can be provided to ushers or other personnel (e.g., devices associated therewith), so that identified users can be allowed into the room or entrance. Similarly, the access module 204 can send an instruction to a computing device associated with a door or other mechanism to open or unlock automatically when a UE of a qualifying user is detected nearby (e.g., within a threshold distance thereof). For instance, if the UE 112 is a qualifying user, the access module 204 can send an instruction to a computing device associated with a door or other mechanism to open or unlock automatically when the UE 112 is detected nearby (e.g., within a threshold distance thereof). In at least one example, the access module 204 can additionally send an indication to the client application 122 to direct the user to the room or entrance. In at least one example, the control module 214 can modify the distribution of network technology to avail such a service to the UE 112.

Furthermore, as described above, the content module 208 can generate and serve content to the user, via the client application 122 (e.g., provide a content service). In at least one example, the content module 208 can receive and/or generate content, which can be provided to the client application 122. The client application 122 can present the content via the UE 112. For example, the client application 122 can present content to enable a user to access game videos, statistics, highlights, or other features. As described above, the client application 122 can also offer other features, such as social network integration, translation, or other disability-friendly services within or proximate to the facility 106. In such examples, the content module 208 can facilitate the social network integration, translation, or other disability-friendly services. In at least one example, the control module 214 can modify the distribution of network technology to avail such a service to the UE 112.

In some examples, the client application 122 can enable a user to access AR functionality, which enables the user to view events via a composite view presented via the UE 112 (e.g., view a ball trajectory, view an upcoming song, etc.), view and/or create messages that include AR features, participate in games within or proximate to the facility 106 using AR (e.g., scavenger hunt, etc.), and so on. In at least one example, the content module 208 can generate AR content, which can be presented via the client application 122. In at least one example, the control module 214 can modify the distribution of network technology to avail such a service to the UE 112.

In at least one example, the ecommerce module 210 can facilitate ecommerce transactions (e.g., provide an ordering service). In at least one example, one or more vendors, merchants, etc. can make their inventory available via the ecommerce module 210. At least a portion of the inventory can be presented to users via respective instances of the client application 122. In at least one example, a user can interact with the client application 122 to order one or more items. The ecommerce module 210 can receive the order and can transmit the order to the one or more vendors, merchants, etc. In some examples, the order can be an order for pick-up, which can be picked up by a user at a place of business of a vendor, merchant, etc. In other examples, the order can be an order for delivery, to a location specified by the user (e.g., the user's seat, another location within or proximate to the facility 106, etc.). In such examples, a facility personnel, a robot, an unmanned aerial vehicle (e.g., a drone), etc. can deliver item(s) in the order to the location specified by the user. In at least one example, the control module 214 can modify the distribution of network technology to avail such a service to the UE 112.

As described above, the navigation module 212 can utilize map data associated with the facility 106 to determine instructions for guiding a user to and/or between locations within or proximate to the facility 106 (e.g., provide a navigation service). In at least one example, the navigation module 212 can utilize location data or other presence information to determine a current location of the UE 112. The navigation module 212 can determine an intended destination of a user, which can be a seat in the facility 106, a location of a friend, a location of interest (e.g., shops, bathrooms, mascots, etc.). As described above, the navigation module 212 can determine one or more instructions for guiding the user to the intended destination. In at least one example, such instructions can be sent to the client application 122 and can be output to the user, via the input/output device(s) 125 (e.g., display, speaker, etc.). In some examples, the instructions can include stops at particular locations associated with the service provider, which can include an incentive for stopping at said locations. In additional or alternative examples, the instructions can be associated with a game, such as a scavenger hunt, or other game that can be presented via a composite view (e.g., AR) output via the client application 122. In at least one example, the control module 214 can modify the distribution of network technology to avail such a service to the UE 112.

Operation 312 illustrates refraining from taking an action. If a UE is not associated with an account, the server(s) 102 can refrain from taking any action. That is, the control module 214 can refrain from modifying a distribution of network technology as described herein. As a result, a UE that is not associated with an account may not have access to the same services that a UE associated with an account.

Figure 4:
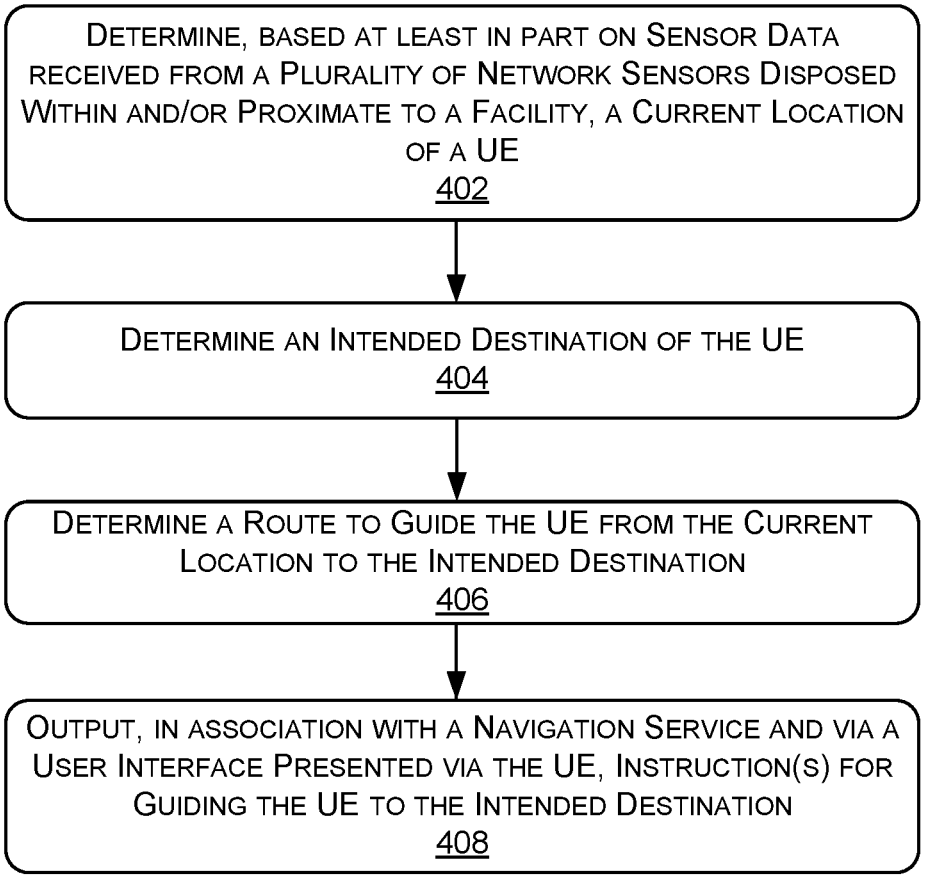
FIG. 4 illustrates an example process for guiding a user to an intended destination within or proximate to a facility.

FIG. 4 illustrates an example process 400 for guiding a user to an intended destination within or proximate to a facility.

Operation 402 illustrates determining, based at least in part on sensor data received from network sensors disposed within and/or proximate to a facility, a current location of a UE. As described above with reference to operations 302 and 304, in at least one example, the identification module 200 can identify the presence of UEs in a facility, such as the facility 106. Furthermore, in some examples, the identification module 200 can determine a current location of a UE, such as the UE 112. For example, GPS data can be used to determine a current location of the UE 112 within or proximate to the facility 106. In additional or alternative examples, an indication of a scan of a code and/or a check-in can be associated with location data that can be used to determine a current location of the UE 112 within or proximate to the facility 106. Furthermore, in some examples, the identification module 200 can determine a current location of the UE 112 within or proximate to the facility 106 using beacon signals, as described above.

Operation 404 illustrates determining an intended destination of the UE. In at least one example, the navigation module 212 can determine an intended destination of a user, which can be a seat in the facility 106, a location of a friend, a location of interest (e.g., shops, bathrooms, mascots, etc.). In at least one example, the user can specify, via the client application 122, a location of interest and the navigation module 212 can determine the intended destination of the UE 112 based on the user input. For example, a user can interact with a digital map to identify a location of interest. In another example, a user can provide speech input indicating a location of interest. In other examples, the navigation module 212 can infer a location of interest, for example, based on a ticket for an event at the facility 106, user preferences (which can be based on historical data, account data, etc.), etc.

Operation 406 illustrates determining a route to guide the UE from a current location to the intended destination. The navigation module 212 can determine one or more instructions for guiding the user to the intended destination. In at least one example, the navigation module 212 can access map data associated with the facility 106 and can determine a route for guiding the user from the current location to the intended destination. In some examples, the route can be based at least in part on one or more parameters (e.g., fastest route, most direct route, route that directs a user by a particular location, etc.).

Operation 408 illustrates outputting, in association with a navigation service and via a user interface presented via the UE, one or more instructions for guiding the UE to the intended destination (e.g., along the route). In at least one example, the one or more instructions can be sent to the client application 122 and can be output to the user, via the input/output device(s) 125 (e.g., display, speaker, etc.) of the UE 112. In some examples, the one or more instructions can include stops at particular locations associated with the service provider, which can include an incentive for stopping at said locations. In additional or alternative examples, the instructions can be associated with a game, such as a scavenger hunt, or other game that can be presented via a composite view (e.g., AR) output via the client application 122.

Figure 5:
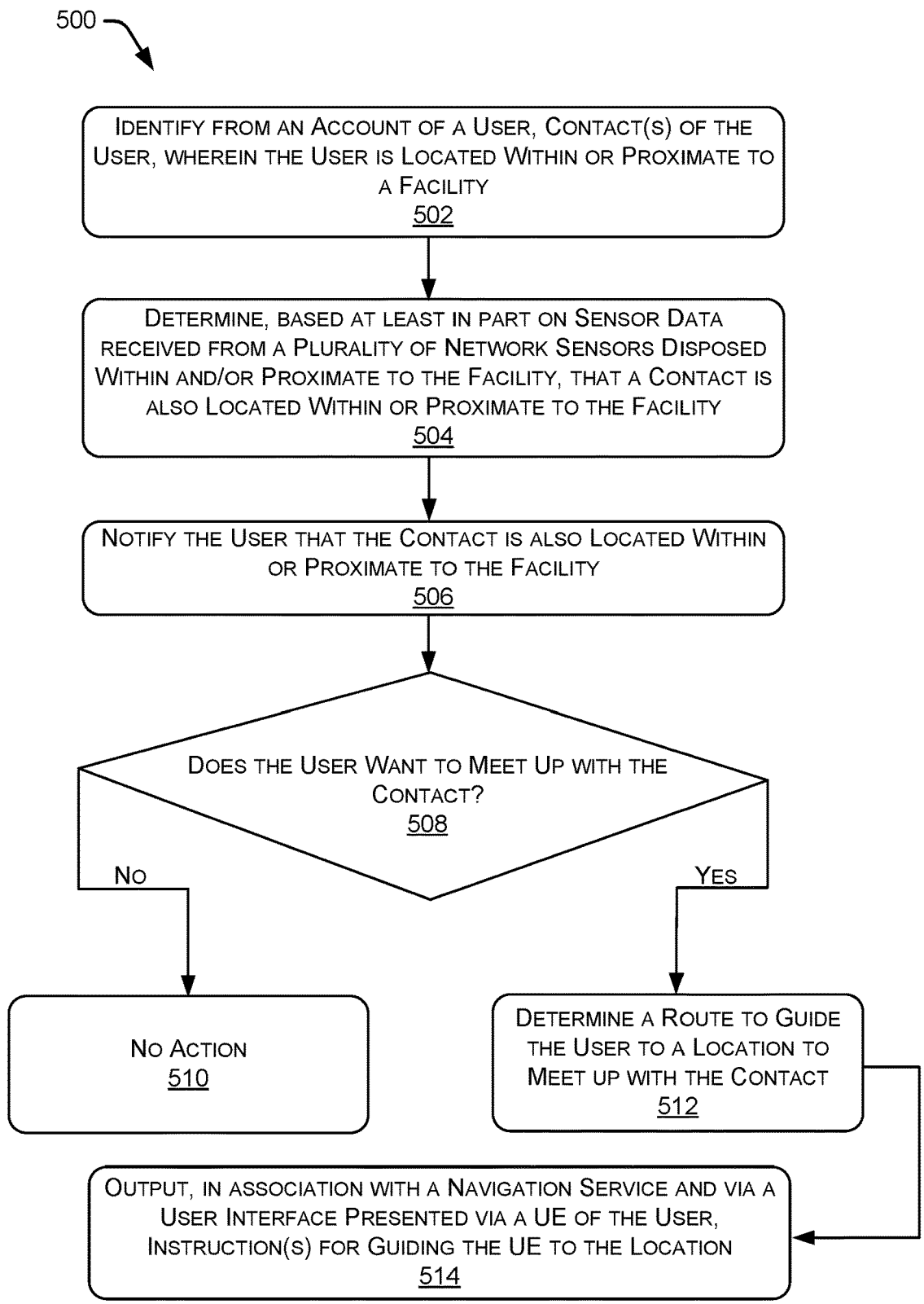
FIG. 5 illustrates an example process for guiding a user to a location to meet up with a contact of the user.

FIG. 5 illustrates an example process 500 for guiding a user to a location to meet up with a contact of the user.

Operation 502 illustrates identifying from an account of a user, one or more contacts of the user, wherein the user is located within or proximate to a facility. As described above with reference to FIG. 3, responsive to determining that a UE, such as the UE 112, is associated with an account of a user, the identification module 200 can access account data of the account. In at least one example, the account data can indicate contacts of the user of the UE 112. That is, the account data can identify other accounts (and corresponding UEs) that the UE 112 has stored as a contact for example, for communicating (e.g., calling, messaging, etc.) with via telecommunications services of the telecommunications service provider.

Operation 504 illustrates determining, based at least in part on sensor data received from network sensors disposed within and/or proximate to the facility, that at least one contact of the one or more contacts is also located within or proximate to the facility. As described above with reference to operations 302 and 304, in at least one example, the identification module 200 can identify the presence of UEs in a facility, such as the facility 106. In at least one example, the identification module 200 can determine that a UE associated with a contact of the user is also present within or proximate to the facility 106.

Operation 506 illustrates notifying the user that the at least one contact is also located within or proximate to the facility. Responsive to determining that the UE associated with a contact of the user is also present within or proximate to the facility 106, the identification module 200 can send a notification to the UE 112 to notify the user. In some examples, the notification can include a mechanism to enable the user to indicate whether he or she wants to meet up with the contact (or not), or if the user wants to invite the contact to meet up (or not), etc. For example, the mechanism can be a control, the actuation of which can cause an indication to be sent to the server(s) 102.

Operation 508 illustrates determining whether the user desires to meet up with the contact. In at least one example, the identification module 200 can determine whether an indication of whether the user desires to meet up with the contact is received. That is, the identification module 200 can perform a check at a particular frequency, after a lapse of a period of time, etc. to determine whether the user has indicated (e.g., via an interaction with the client application 122 or a notification presented via the client application 122) that he or she desires to meet up with the contact. If the user does not desire to meet up with the contact, the navigation module 212 can refrain from taking further action, as illustrated at operation 510.

Operation 512 illustrates determining a route to guide the user to a location to meet up with the contact. If the user desires to meet up with the contact, the identification module 200 can provide an indication of such to the navigation module 212. In at least one example, the identification module 200 can determine a current location of the UE associated with the user, such as the UE 112, and a current location of a UE associated with a contact. For example, GPS data can be used to determine current locations of the UEs within or proximate to the facility 106. In additional or alternative examples, an indication of a scan of a code and/or a check-in can be associated with location data that can be used to determine current locations of the UEs. Furthermore, in some examples, the identification module 200 can determine a current location of the UEs within or proximate to the facility 106 using beacon signals, as described above.

In at least one example, the navigation module 212 can determine one or more instructions for guiding the user from the current location of the UE to a location associated with the UE of the contact. In some examples, the user and the contact may want to meet up at a location different than the location of the user or the location of the contact. In such an example, the user (or the contact) can specify such a location. In at least one example, the navigation module 212 can access map data associated with the facility 106 and can determine a route for guiding the user (and, in some examples, the contact) from the current location to an intended destination. In some examples, the route can be based at least in part on one or more parameters (e.g., fastest route, most direct route, route that directs a user by a particular location, etc.).

Operation 514 illustrates outputting, in association with a navigation service and via a user interface presented via a UE of the user, one or more instructions for guiding the UE to the intended destination (e.g., along the route). In at least one example, the one or more instructions can be sent to the client application 122 and can be output to the user, via the input/output device(s) 125 (e.g., display, speaker, etc.). In some examples, the one or more instructions can include stops at particular locations associated with the service provider, which can include an incentive for stopping at said locations. In additional or alternative examples, the instructions can be associated with a game, such as a scavenger hunt, or other game that can be presented via a composite view (e.g., AR) output via the client application 122. In at least one example, the navigation module 212 can cause one or more instructions to be output via a respective instance of the client application 122 on the UE of the contact to guide the contact to the intended destination to meet up with the user.

Figure 6:
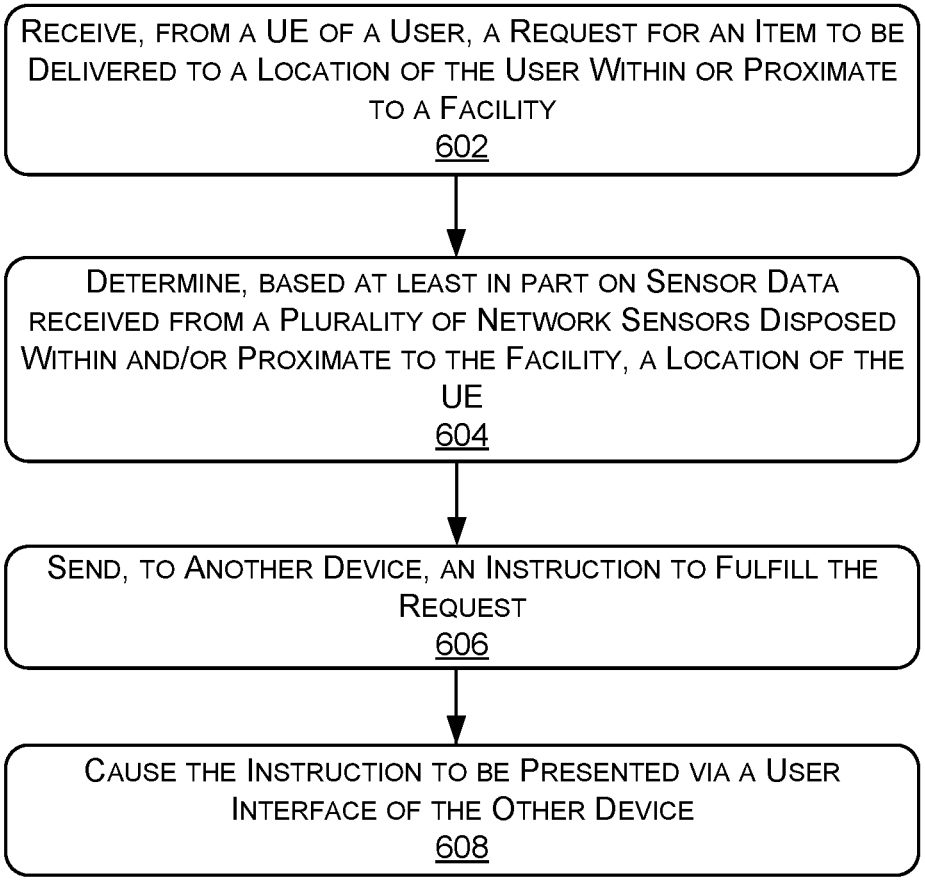
FIG. 6 illustrates an example process for fulfilling a request from a user within or proximate to a facility.

FIG. 6 illustrates an example process 600 for fulfilling a request from a user within or proximate to a facility.

Operation 602 illustrates receiving, from a UE of a user, a request for an item to be delivered to a location of the user within or proximate to a facility. As described above, in at least one example, one or more vendors, merchants, etc. can make their inventory available via the ecommerce module 210. At least a portion of the inventory can be presented to users via respective instances of the client application 122. In at least one example, a user can interact with the client application 122 to order one or more items. That is, in at least one example, responsive to a user interaction with the client application 122 to order one or more items, the client application 122 can send a request for the one or more items to the ecommerce module 210. In some examples, the request can be associated with an indication to deliver the one or more items to a location of the user (e.g., UE associated therewith).

Operation 604 illustrates determining, based at least in part on sensor data received from network sensors disposed within and/or proximate to a facility, a location of the UE. In at least one example, the ecommerce module 210 can receive the order and can determine the location of the user. In some examples, the request can be associated with location data indicative of a location of the user and/or a preferred delivery location (if different than the location of the user). However, if the request is not associated with such location data, the ecommerce module 210 can request the location of the user from the identification module 200. As described above with reference to operations 302 and 304, in at least one example, the identification module 200 can identify the presence of UEs in a facility, such as the facility 106. Furthermore, in some examples, the identification module 200 can determine a current location of a UE, such as the UE 112. For example, GPS data can be used to determine a current location of the UE 112 within or proximate to the facility 106. In additional or alternative examples, an indication of a scan of a code and/or a check-in can be associated with location data that can be used to determine a current location of the UE 112 within or proximate to the facility 106. Furthermore, in some examples, the identification module 200 can determine a current location of the UE 112 within or proximate to the facility 106 using beacon signals, as described above.

Operation 606 illustrates sending, to another device operable by an agent of a service provider, an instruction to fulfill the request. In at least one example, the ecommerce module 210 can receive the order and can transmit the order to device(s) associated with the one or more vendors, merchants, etc. with whom the one or more items are associated. In at least one example, the ecommerce module 210 can include instructions for delivering the one or more items to a location of the user. In at least one example, the order, and associated fulfillment instruction(s), can be presented via the device(s) of the one or more vendors, merchants, etc., as illustrated at operation 608. As such, a facility personnel, a robot, an unmanned aerial vehicle (e.g., a drone), etc. can deliver item(s) in the order to the location of the user. In some examples, the other device can request updated location data prior to delivering the one or more items to the location of the user. In such examples, the identification module 200 can determine the current location of the UE associated with the user using techniques described above and can provide updated location data to at least the other device. As a result, the user can have item(s) delivered to a specified location through an interaction with the client application 122, which can enable the user to avoid waiting in lines for such items.

Figure 7:
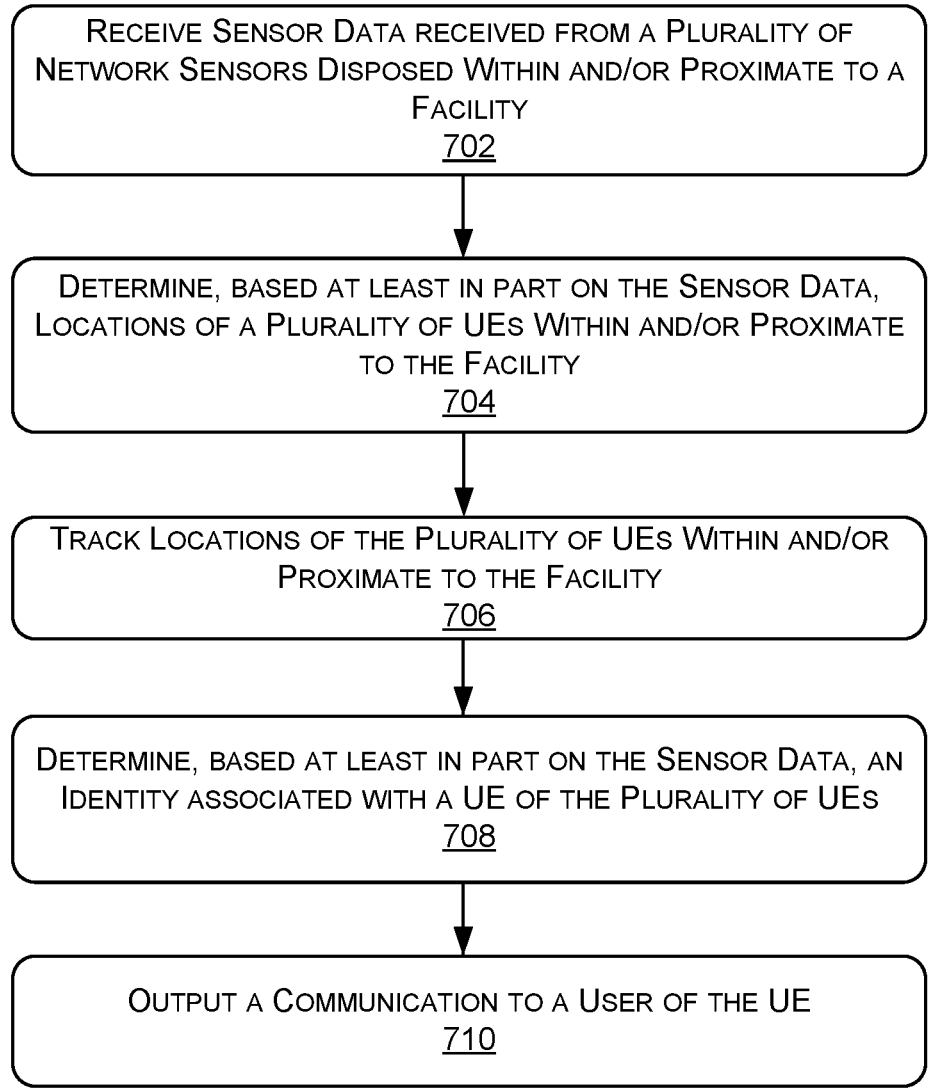
FIG. 7 illustrates an example process for outputting a communication to a user within or proximate to a facility, based at least in part on sensor data received from network sensors disposed within and/or proximate to a facility.

FIG. 7 illustrates an example process 700 for outputting a communication to a user within or proximate to a facility, based at least in part on sensor data received from network sensors disposed within and/or proximate to a facility.

Operation 702 illustrates receiving sensor data from network sensors disposed within and/or proximate to a facility. As described above, facilities, such as the facility 106, can have network sensors 104 disposed within and/or proximate to the facilities. The network sensors 104 can generate sensor data which can be transmitted from the network sensors 104 to the server(s) 102. In some examples, the sensor data can be transmitted to the servers(s) 102 directly. In other examples, the sensor data can be transmitted to the server(s) 102 via base station(s) 110 and/or another network resource (e.g., indirectly). For example, in some examples, one or more beacons can transmit reference signals that can be received by the sensor(s) 120, and the UE 112 can report the information received from the beacon(s) to the server(s) 102 via the network(s) 108.

Operation 704 illustrates determining, based at least in part on the sensor data, locations of a plurality of UEs within or proximate to the facility. As described above with reference to FIG. 3, the identification module 200 can identify the presence of UEs in a facility, such as the facility 106. For instance, in at least one example, the identification module 200 can receive GPS data from UEs and can determine a presence of UEs within or proximate to the facility 106 based at least in part on the GPS data. Furthermore, in some examples, the GPS data can be used to determine locations of the UEs within or proximate to the facility 106.

In additional or alternative examples, users can scan codes and/or can check-in, for example, via a social media application or the like, at the facility 106. Responsive to receiving an indication of the code scans and/or check-ins, the identification module 200 can determine a presence of UEs within or proximate to the facility 106. In some examples, indications of code scans and/or check-ins can be associated with location data that can be used to determine locations of the UEs within or proximate to the facility 106.

Furthermore, in some examples, the identification module 200 can determine the presence of UEs within or proximate to the facility 106 using beacon signals. As described above, in at least one example, the network sensor(s) 104 can, in addition to performing other tasks, emit beacon signal(s), which can be detected by individual of the network sensors 104. In such an example, the network sensors 104, which can be placed throughout the facility 106 and can be in communication with the server(s) 102, can allow the detection of the presence of UEs and/or the determination of location of UEs within or proximate to the facility 106.

Operation 706 illustrates tracking the locations of the plurality of UEs within or proximate to the facility. The tracking module 202 can track the locations of UEs within or proximate to the facility 106 over time. That is, the tracking module 202 can receive location data, indications (e.g., of code scans, check-ins, etc.), and/or beacon signals (or indications associated therewith) indicative of locations of UEs within or proximate to the facility 106. The tracking module 202 can receive updated location data, indications (e.g., of code scans, check-ins, etc.), and/or beacon signals (or indications associated therewith) indicative of locations of UEs within or proximate to the facility 106 over time. As time progresses, the tracking module 202 can track the movement of individual UEs throughout the facility 106.

Operation 708 illustrates determining, based at least in part on the sensor data, an identity associated with a UE of the plurality of UEs. As described above with reference to FIG. 3, in at least one example, the identification module 200 can determine an identity of individual UEs within or proximate to the facility 106. In at least one example, the identification module 200 can identify users associated with identified UEs. For example, in at least one example, the beacon signals from the UEs can include an identifier, such as a user identifier. Accordingly, the identification module 200 can also identify a user and/or user account associated with a particular UE. For example, a user of a UE 112 can be logged in to the client application 122 associated with their account with the service provider. The client application 122 can cause the UE 112 to emit beacon signals that include an identifier linked to the user's account.

Furthermore, in some examples, an indication of a scan of the code and/or a check-in can be associated with identification data that can be used to identify a user. In additional or alternative examples, at least some of the network sensors 104 can be associated with cameras, speakers, or other devices that can be used for performing voice or facial recognition. That is, such network sensors 104 can detect speech input or visual input (e.g., image, video, etc.) and can process the input, for instance using automatic speech recognition technologies, computer vision technologies, etc., to identify a user associated with a particular UE.

In at least one example, responsive to determining an identity of a user, the identification module 200 can access the account(s) 132 to access data associated with the user.

Operation 710 illustrates outputting a communication to a user of the UE. based at least in part on the tracking, a communication to the user. In at least one example, tracking data can be analyzed to determine characteristics associated with the facility 106 and/or locations within or associated with the facility 106. For example, tracking data can indicate how users are moving within or proximate to the facility 106, where users are waiting in lines, how quickly the lines are moving, and so on. As an example, the tracking module 202 can analyze how users are using the facility 106. For instance, by tracking locations of multiple UEs within or proximate to the facility 106, the tracking module 202 can analyze how long users are standing in line for specific food booths or for specific bathrooms at known locations within the facility, or how long it is taking users to enter the facility, exit the facility, find parking in a parking garage, or leave the parking garage. This data can then be provided to UEs via respective instances of the client application 122, for instance, by providing estimated wait times for entities associated with the facility, such as vendors (e.g., food booths, merchandise booths, etc.), bathrooms, entries, exits, parking garages and the like. That is, the tracking module 202 can send a communication to the client application 122 on the UE 112 to alert the user of the respective estimated wait times. In some examples, the communication can be personalized and/or customized for the user, for example, based on a location of the user, account data associated with the user, and so on.

Furthermore, in some examples, the communication can be a recommendation. As described above, the recommendation module 206 can generate and cause the presentation of recommendations to users within or proximate to the facility 106. Identities of UEs present in facilities (e.g., the user account data) can be used for personalizing and/or customizing user experiences, as described above. For example, machine learning or other predictive algorithms can use historical data tracked about such identified users to identify where they may go next within the facility, what they might want to buy, etc. Furthermore, in some examples, tracking data, as described above, can be used for generating recommendations for a particular user associated with the UE 112. Accordingly, in at least one example, the recommendation module 206 can generate a recommendation that can be presented to the particular user, which can be based on historical data (e.g., associated with that user, a group of similar users, a general population of users, etc.). In some examples, the recommendation can be associated with an offer, a discount, an incentive, or the like. The recommendation module 206 can send recommendations (e.g., a communication associated with a recommendation) to the client application 122 and the client application 122 can cause the recommendation to be output via the UE 112.

In at least one example, the access module 204 can grant access to particular services. For example, in at least one example, when a room or entrance is available to a subset of people within or proximate to the facility 106 (e.g., users of the service provider, users with a particular service plan and/or level, VIPs, influencers, etc.), the access module 204 can identify UEs associated with those people as indicated above. This identification data can be provided to ushers or other personnel (e.g., devices associated therewith), so that identified users can be allowed into the room or entrance. Similarly, the access module 204 can send an instruction to a computing device associated with a door or other mechanism to open or unlock automatically when a UE of a qualifying user is detected nearby (e.g., within a threshold distance thereof). For instance, if the UE 112 is a qualifying user, the access module 204 can send an instruction to a computing device associated with a door or other mechanism to open or unlock automatically when the UE 112 is detected nearby (e.g., within a threshold distance thereof). In at least one example, the access module 204 can additionally send an indication to the client application 122 to direct the user to the room or entrance.

While three types of communications are described above, additional or alternative communications can be transmitted from the server(s) 102 to UEs, as described herein.

Figure 8:
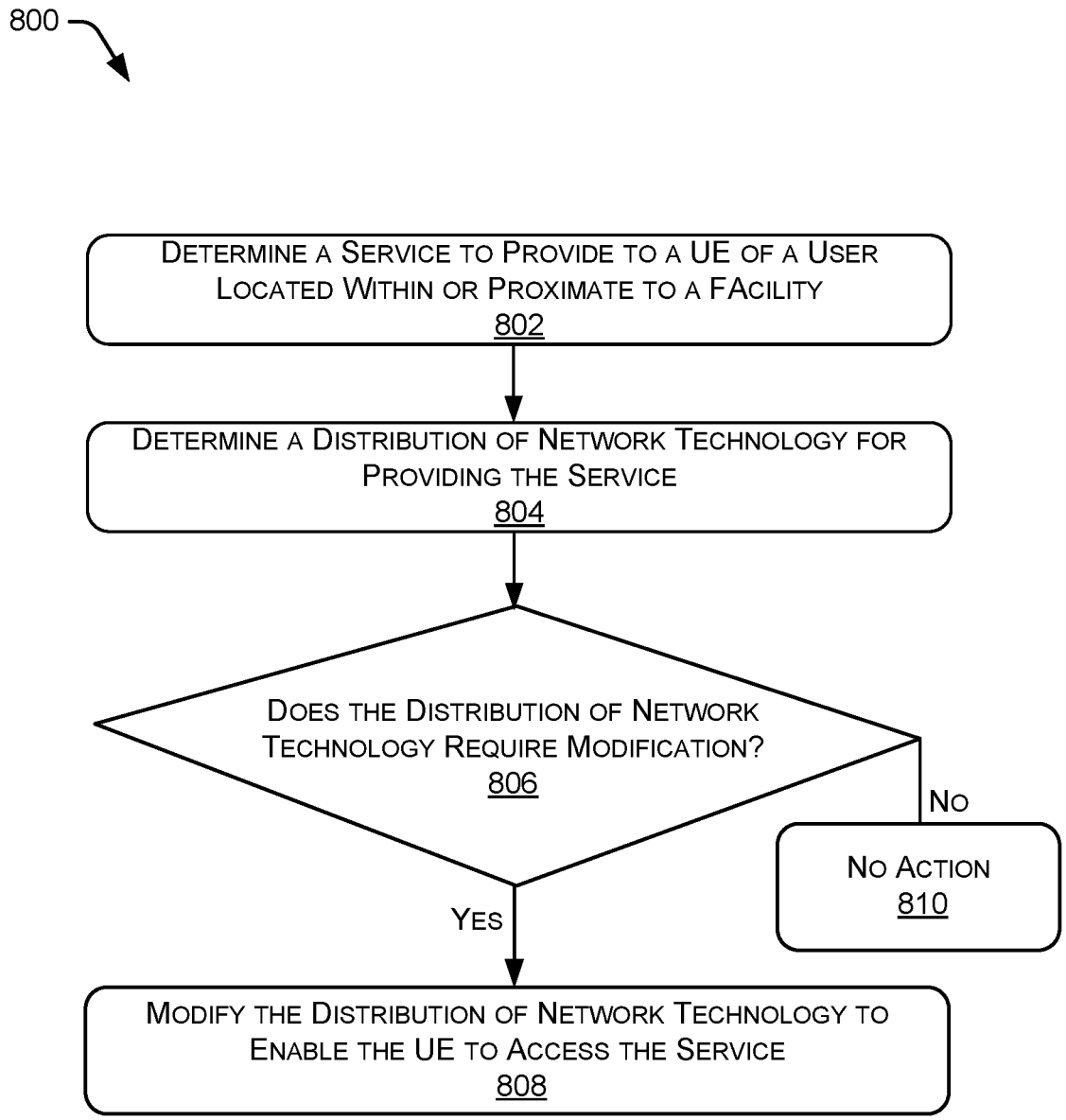
FIG. 8 illustrates an example process for modifying a distribution of network technology to enable a UE to access a service.

FIG. 8 illustrates an example process 800 for modifying a distribution of network technology to enable a UE to access a service.

Operation 802 illustrates determining a service to provide to a UE of a user located within or proximate to a facility. As described above with reference to FIG. 3, in at least one example, the identification module 200 can determine a presence, a location, and/or an identity of a UE, such as the UE 112. In at least one example, the identification module 200 can identify users associated with identified UEs. In at least one example, responsive to determining an identity of a user of the UE 112, the identification module 200 can access the account(s) 132 to access data associated with the user. In at least one example, the server(s) 102 can determine to provide the user (e.g., the UE 112 associated therewith) a service based at least in part on account data associated with the user. Such a service can be availed to the user personally, other users similar to the user (e.g., share at least one characteristic, are associated with a similarity value that meets or exceeds a threshold, etc.), etc.

Operation 804 illustrates determining a distribution of network technology for providing the service. As described above, different services require different distributions of network technology. In at least one example, the control module 214 can analyze a current distribution of network technology to determine the current distribution of network technology.

Operation 806 illustrates determining whether the distribution of network technology requires modification. In at least one example, the control module 214 can determine the distribution of network technology required to provide the service and can determine whether the current distribution of network technology is sufficient to provide the service to the UE 112.

Operation 808 illustrates modifying the distribution of network technology to enable the UE to access the service. If the current distribution of network technology is insufficient to provide the service, the control module 214 can modify a distribution of network technology. In at least one example, the control module 214 can effectuate modifications to the distribution of network technology by modifying at least one or more of a network function, a network resource, or a relationship between network connections. That is, the control module 214 can effectuate network slicing to enable dynamic, "on-demand," customized and/or personal user experiences.

In at least one example, the control module 214 can implement "network slicing" to facilitate the provisioning of differentiated services. For example, responsive to detecting a presence of the UE 112 within or proximate to the facility 106, and determining to provision at least one service to the UE 112 that is not otherwise available to at least one other user within or proximate to the facility 106 (e.g., based on account data), the control module 214 can modify the radio access technology through which the UE 112 access the network(s) 108. To provide the at least one service, the control module 214 can transition the UE 112 to a 5G radio access technology, which can avail a 5G telecommunications service to the UE 112. As a result, the UE 112 can access more data in a shorter period of time (i.e., faster) than with other radio access technologies, even in sparse or densely populated areas. Thus, the UE 112 can access content services availed by the content module 208 and/or navigation services availed by the navigation module 212 with high levels of throughput (for both uplink and downlink data transmissions). Furthermore, in some examples, levels of spectrum can be sliced and tailored to handle performance requirements for a particular service. For example, different network slices can use different distributions models of network function and applications to optimize the topology through which data is transmitted for providing the particular service. Further, throughput can be allocated based on needs of the particular service. Moreover, different network slices can have different levels and/or types of availability and/or resilience, which can be determined based on needs of the particular service. In at least one example, resources associated with access infrastructure can be assigned to and/or used by different services, as determined by the control module 214.

Operation 810 illustrates refraining from taking an action with respect to modification of the distribution of the network technology. In at least one example, if the distribution of network technology is sufficient to avail the service to the user, the control module 214 can refrain from modifying the distribution of network technology.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a plurality of network sensors disposed within and proximate to a facility;
   one or more processors; and
   computer-readable instructions that, when executed by the one or more processors, cause the one or more processors to perform operations comprising:
      determining, based on sensor data received from at least one sensor of the plurality of network sensors, a presence of a user equipment (UE) within or proximate to the facility;
      accessing, based at least in part on the sensor data, account data associated with the UE;
      determining, based at least in part on the account data, to modify a distribution of network technology to temporarily enable the UE to access a service that is not otherwise available to at least one other UE within or proximate to the facility;
      modifying the distribution of network technology to temporarily enable the UE to access the service that is not otherwise available to the at least one other UE within or proximate to the facility;
      determining, based at least in part on the sensor data, a location of the UE; and
      outputting, via a navigation service, instructions for directing the UE to a new location of interest within the facility.

2. The system as claim 1 recites, wherein the service comprises a content service that is presented via an application on the UE.

3. The system as claim 1 recites, wherein the service comprises the navigation service, presented via an application on the UE.

4. The system as claim 3 recites, the operations further comprising:
   accessing, from the account data, one or more contacts associated with the account data;
   determining, based at least in part on the sensor data, that a contact of the one or more contacts is also present within or proximate to the facility and a location of the contact; and
   outputting, via the navigation service, instructions for directing the UE to the location of the contact.

5. The system as claim 1 recites, wherein the service comprises an ordering service that is presented via an application on the UE.

6. The system as claim 1 recites, the operations further comprising:
   determining, based at least in part on the sensor data, a plurality of locations of a plurality of UEs including the UE;
   tracking, based at least in part on additional sensor data received from the at least one sensor, movement of individual UEs of the plurality of UEs within the facility; and
   providing, via an application associated with the UE, an estimated wait time associated with an entity within the facility.

7. The system as claim 6 recites, wherein the entity within the facility comprises a bathroom, a vendor, an entry, or an exit.

8. The system as claim 1 recites, wherein the account data includes at least one of a purchase history of an account, a search history associated with the account, a billing history associated with the account, a subscription tier associated with the account, services associated with the account, a number of lines associated with the account, or devices associated with the account.

9. The system as claim 1 recites, wherein the service comprises a Fifth Generation (5G) telecommunication service.

10. The system as claim 1 recites, wherein modifying the distribution of network technology comprises modifying at least one or more of a network function, a network resource, or a relationship between network connections.

11. A computer-implemented method comprising:
- determining, based on sensor data associated with a facility, a presence of a user equipment (UE) within or proximate to the facility;
- accessing, based at least in part on the sensor data, an account associated with the UE;
- modifying, based at least in part on account data associated with the account, a distribution of network technology to temporarily enable the UE to access a service that is not otherwise available to at least one other UE within or proximate to the facility;
- determining, based at least in part on the sensor data, a plurality of locations of a plurality of UEs, including the UE;
- tracking, based at least in part on additional sensor data received from the at least one sensor, movement of individual UEs of the plurality of UEs within the facility; and
- providing, via an application associated with the UE, an estimated wait time associated with an entity within the facility.

12. The computer-implemented method as claim 11 recites, wherein the service comprises at least one of:
- a content service that is presented via an application on the UE;
- a navigation service that is presented via an application on the UE;
- an ordering service that is presented via an application on the UE; or
- a Fifth Generation (5G) telecommunication service.

13. The computer-implemented method as claim 12 recites, wherein the service is the navigation service and the computer-implemented method comprises:
- accessing one or more contacts associated with account data;
- determining, based at least in part on the sensor data, that a contact of the one or more contacts is also present within or proximate to the facility and a location of the contact; and
- outputting, via the navigation service, instructions for directing the UE to at least one of the location of the contact or another location to meet the contact.

14. The computer-implemented method as claim 11 recites,
wherein the entity within the facility comprises a bathroom, a vendor, an entry, or an exit.

15. The computer-implemented method as claim 11 recites, wherein modifying the distribution of network technology comprises modifying at least one or more of a network function, a network resource, or a relationship between network connections.

16. One or more non-transitory computer-readable media executable by one or more processors, that when executed by the one or more processors, cause the one or more processors to perform operations comprising:
- determining, based on sensor data associated with a facility, a presence of a user equipment (UE) within or proximate to the facility;
- accessing, based at least in part on the sensor data, an account associated with the UE;
- modifying, based at least in part on account data associated with the account, a distribution of network technology to temporarily enable the UE to access a service that is not otherwise available to at least one other UE within or proximate to the facility;
- accessing, from the account data, one or more contacts associated with the user;
- determining, based at least in part on the sensor data, that a contact of the one or more contacts is also present within or proximate to the facility and a location of the contact; and
- outputting, via a navigation service availed as a result of modifying the distribution of network technology, instructions for directing the user to the location of the contact.

17. The one or more non-transitory computer-readable media as claim 16 recites, wherein the service comprises at least one of:
- a content service that is presented via an application on the UE;
- the navigation service, presented via an application on the UE;
- an ordering service that is presented via an application on the UE; or
- a Fifth Generation (5G) telecommunication service.

18. The one or more non-transitory computer-readable media as claim 16 recites, wherein modifying the distribution of network technology comprises modifying at least one or more of a network function, a network resource, or a relationship between network connections.

* * * * *